United States Patent
Bocquet

(10) Patent No.: US 7,492,830 B2
(45) Date of Patent: Feb. 17, 2009

(54) SIGNAL RECEIVING METHOD IN MIMO SYSTEM AND DEVICE THEREFOR

(75) Inventor: Wladimir Bocquet, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 549 days.

(21) Appl. No.: 11/105,435

(22) Filed: Apr. 14, 2005

(65) Prior Publication Data

US 2006/0045200 A1    Mar. 2, 2006

(30) Foreign Application Priority Data

Aug. 25, 2004  (JP)  ............... 2004-245098

(51) Int. Cl.
*H04B 7/02* (2006.01)

(52) U.S. Cl. .............. 375/267; 375/260; 375/299; 375/340; 375/347; 455/101; 455/132; 455/296; 455/500

(58) Field of Classification Search .............. None
See application file for complete search history.

(56) References Cited

U.S. PATENT DOCUMENTS

| | | | |
|---|---|---|---|
| 6,731,700 B1 | 5/2004 | Yakhnich et al. | ............ 375/341 |
| 7,106,813 B1* | 9/2006 | Ling | ............ 375/343 |
| 2003/0103584 A1 | 6/2003 | Bjerke et al. | ............ 375/340 |
| 2004/0165675 A1* | 8/2004 | Ito et al. | ............ 375/267 |
| 2006/0047842 A1* | 3/2006 | McElwain | ............ 709/231 |

FOREIGN PATENT DOCUMENTS

| | | |
|---|---|---|
| GB | 2400283 A | 10/2004 |
| GB | 2406759 A | 4/2005 |
| GB | 2407007 A | 4/2005 |
| JP | A-2002-44051 | 2/2002 |

OTHER PUBLICATIONS

A. van Zelst, "Space Division Multiplexing Algorithms,", 10th Mediterranean Electrotechnical Conference, *MEleCon*, 2000, vol. III, pp. 1218-1221.

P.W. Wolniansky, et al., "V-Blast: An Architecture for Realizing Very High Data Rates Over the Rich-Scattering Wireless Channel," *IEEE*, 1998, pp. 295-300.

L. J. Cimini, "Analysis and Simulation of a Digital Mobile Channel Using Orthogonal Frequency Division Multiplexing," *IEEE Transactions on Communications*, vol. COM-33, No. 7, Jul. 1985, pp. 665-675.

A. van Zelst, et al., "Implementation of a MIMO OFDM-Based Wireless LAN System," *IEEE Transactions Signal Processing*, vol. 52, No. 2., Feb. 2004, pp. 483-494.

(Continued)

*Primary Examiner*—David C Payne
*Assistant Examiner*—Leon Flores
(74) *Attorney, Agent, or Firm*—Hanify & King, P.C.

(57) ABSTRACT

Transmitted symbols are estimated from received signals. The likelihood of the estimated transmitted symbols is calculated. The mean value and variance of the transmitted symbols are calculated from information indicating the likelihood, and MMSE coefficient for compensating the channel is calculated according to the mean value and variance. The transmitted symbols are estimated again using the MMSE coefficient. The estimation process is repeatedly performed twice or more.

14 Claims, 19 Drawing Sheets

OTHER PUBLICATIONS

Shinsuke Hara, et al., "A Simple Null-Steering Adaptive Array Antenna in OFDM-Based WPAN/WLAN," *IEEE*, 2003, pp. 597-601.

Shinsuke Hara, et al., "Capacity Enhancement by Virtual Subcarrier Assignment for OFDM-Based Wireless Systems," *IEEE*, 2004, pp. 1811-1815.

N. Yee, et al., "Multi-Carrier CDMA in Indoor Wireless Radio Networks," *IEICE Trans. Commun.*, vol. E77-B, No. 7, Jul. 1994, pp. 900-904.

S. Abeta, et al., "Performance of Coherent Multi-Carrier/DS-CDMA and MC-CDMA for Broadband Packet Wireless Access," *IEICE Trans. Commun.*, vol. E84-B, No. 3, pp. 406-414.

H. Sari, et al., "Frequency-Domain Equalization of Mobile Radio and Terrestrial Broadcast Channels," *IEEE*, 1994, pp. 1-5.

B. D. Van Veen, et al., "Beamforming: A Versatile Approach to Spatil Filtering," *IEEE Assp. Magazine*, Apr. 1988, pp. 4-24.

M. Tüchler, et al., "Minimum Mean Squared Error Equalization Using A Priori Information," *IEEE Transactions on Signal Processing*, vol. 50, No. 3, pp. 673-683.

*Performance of LDPC Based Turbo Equalization for Spatial Multiplexing*; by Takaaki Zakoji et al.; 2004 IEEE 15th International Symposium on Personal, Indoor and Mobile Radio Communications, Sep. 5-8, 2004, Barcelona, pub. IEEE, US, vol. 2, pp. 1404-1408.

The British Search Report dated Jul. 14, 2005.

\* cited by examiner

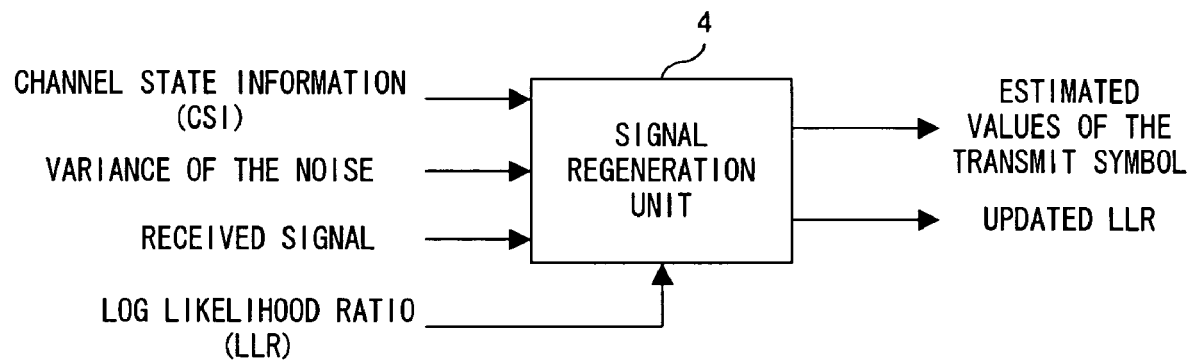
F I G. 3

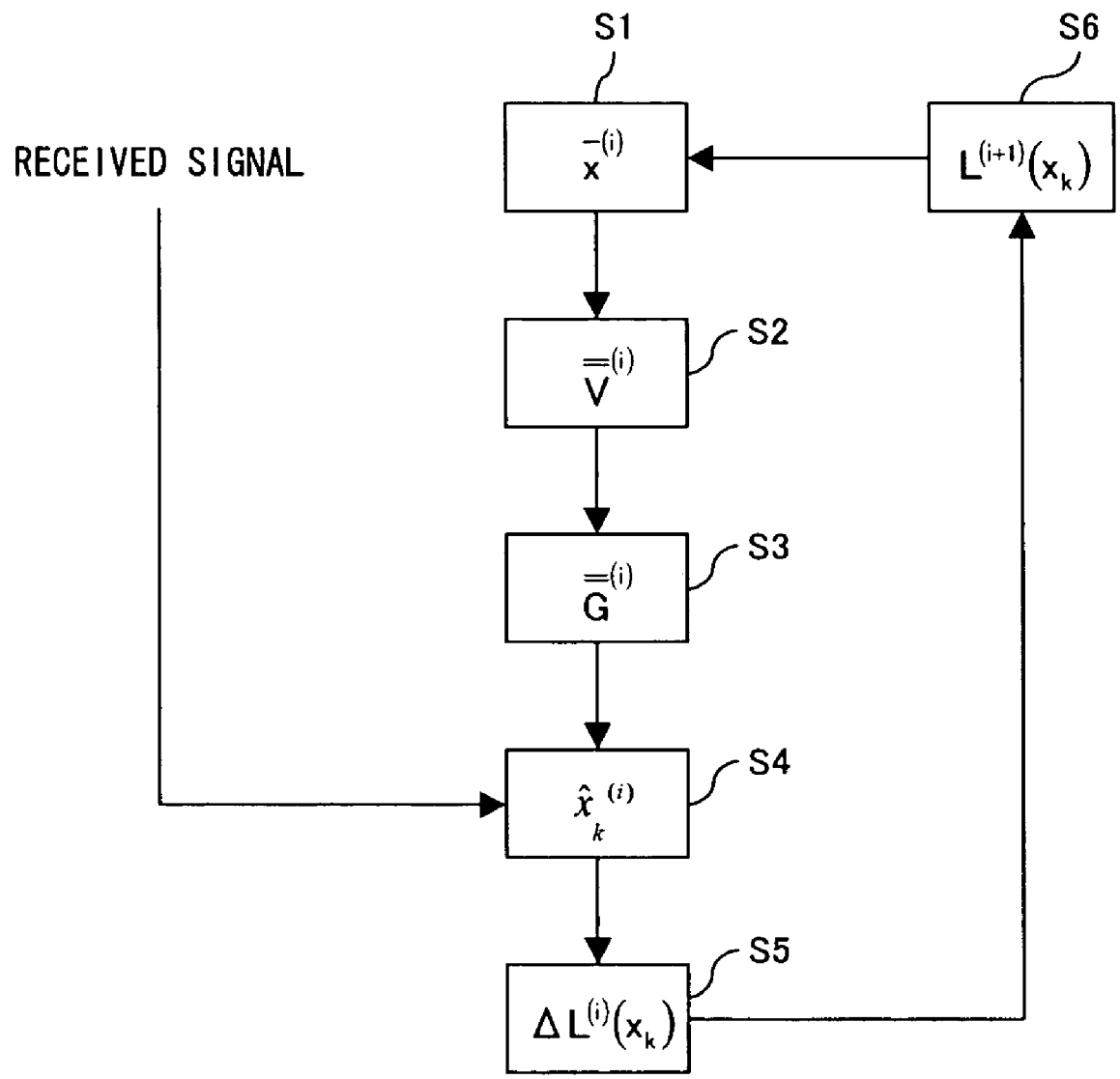
F I G. 5

$$L^{(0)}(x_k) = 0 \quad \forall k$$

for (i<# of Iteration)

for(k=0, ..., Nt-1)

$$\bar{x}_k^{(i)} = \tanh\left(\frac{L^{(i)}(x_k)}{2}\right)$$

$$v_k^{(i)} = 1 - \left|\bar{x}_k^{(i)}\right|^2$$

or: $\bar{\bar{V}}^{(i)} = diag\left(v_0^{(i)}, ..., v_k^{(i)}, ..., v_{Nt-1}^{(i)}\right)$ end $$\bar{\bar{G}}^{(i)} = \frac{\bar{\bar{V}}^{(i)}\bar{\bar{H}}^H}{\bar{\bar{H}}\bar{\bar{V}}^{(i)}\bar{\bar{H}} + \alpha^2 I_{Nr}}$$

where: $\bar{\bar{G}}^{(i)} = \{g_{p,q}^{(i)}\}_{\substack{0 \leq p < Nt-1 \\ 0 \leq q < Nr-1}}$ for(k=0, ..., Nt-1)

$$\hat{x}_k^{(i)} = E\{x_k^{(i)}\} + \sum_{j=0}^{Nr-1} g_{k,j}^{(i)} \cdot (y_j - E\{\bar{y}_j\})$$

where $E\{y_j\} = \sum_{p=0}^{Nt-1} h_{j,p} \cdot E\{x_p^{(i)}\}$ $$\Delta L^{(i)}(x_k) = 4 \cdot \frac{Re\{\hat{x}_k^{(i)}\}}{1 - \sum_{j=0}^{Nt-1} h_{k,j}^* \cdot g_{j,k}^*}$$

$$L^{(i+1)}(x_k) = L^{(i)}(x_k) + \Delta L^{(i)}(x_k)$$

end

F I G. 6

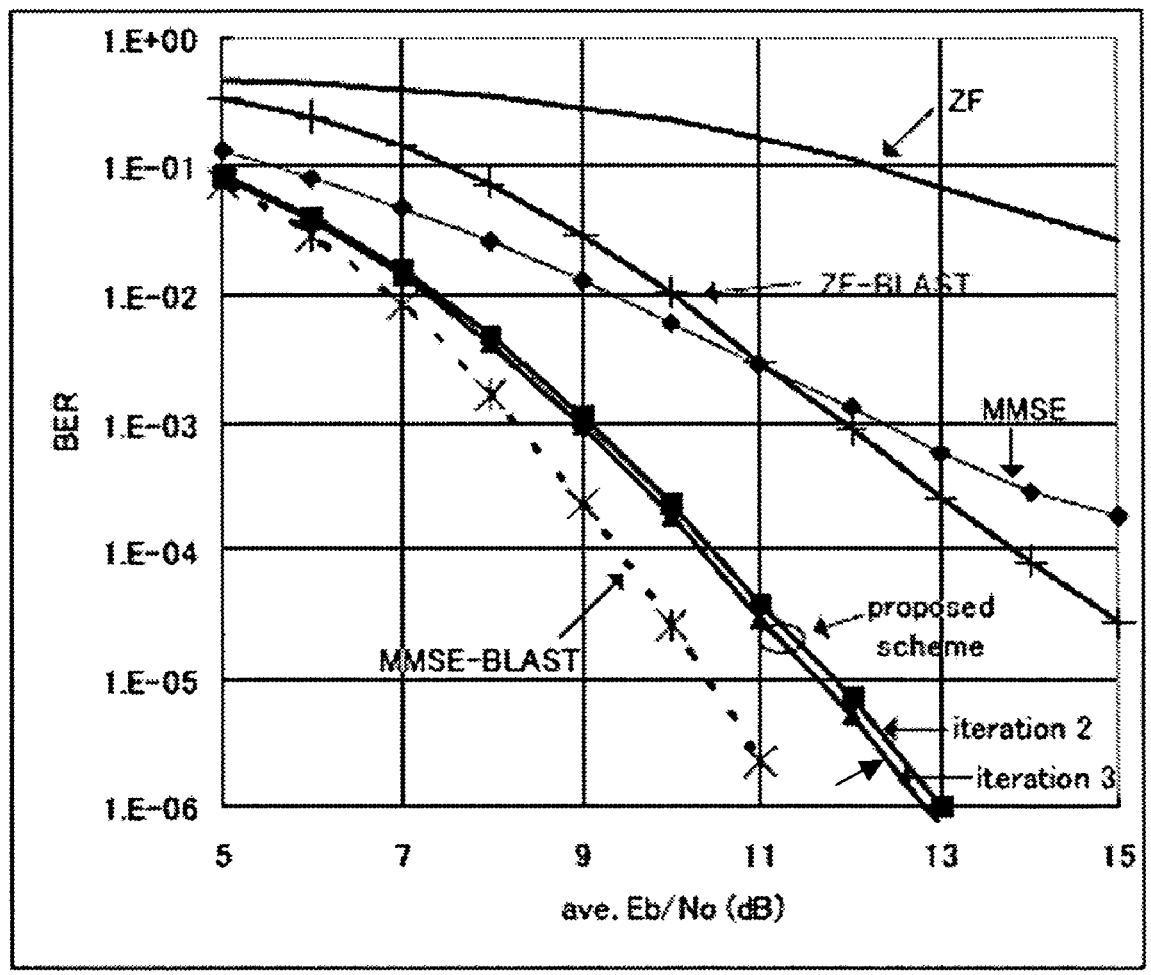
F I G. 7

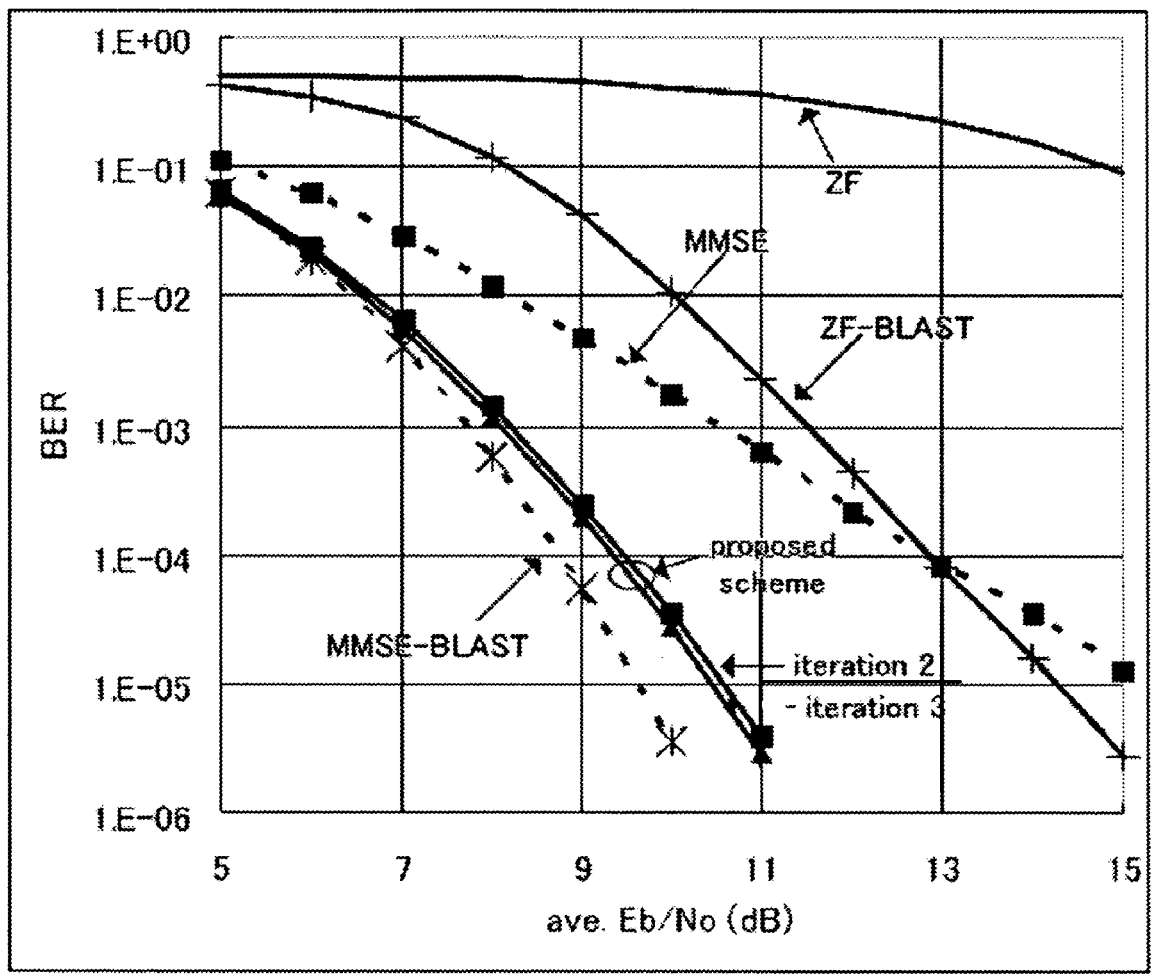
F I G. 8

| MIMO CONFIGURATION (Tx, Rx) | ANTENNA (N) | BLAST SCHEME | PROPOSED SCHEME ITERATION=2 | PROPOSED SCHEME ITERATION=3 |
|---|---|---|---|---|
| 2*2 | 2 | 64 | 96 | 144 |
| 3*3 | 3 | 324 | 324 | 486 |
| 4*4 | 4 | 1024 | 768 | 1152 |
| 5*5 | 5 | 2500 | 1500 | 2250 |
| 6*6 | 6 | 5184 | 2592 | 3888 |
| 7*7 | 7 | 9604 | 4116 | 6174 |
| 8*8 | 8 | 16384 | 6144 | 9216 |
| 9*9 | 9 | 26244 | 8748 | 13122 |
| 10*10 | 10 | 40000 | 12000 | 18000 |
| 11*11 | 11 | 58564 | 15972 | 23958 |
| 12*12 | 12 | 82944 | 20736 | 31104 |

FIG. 9

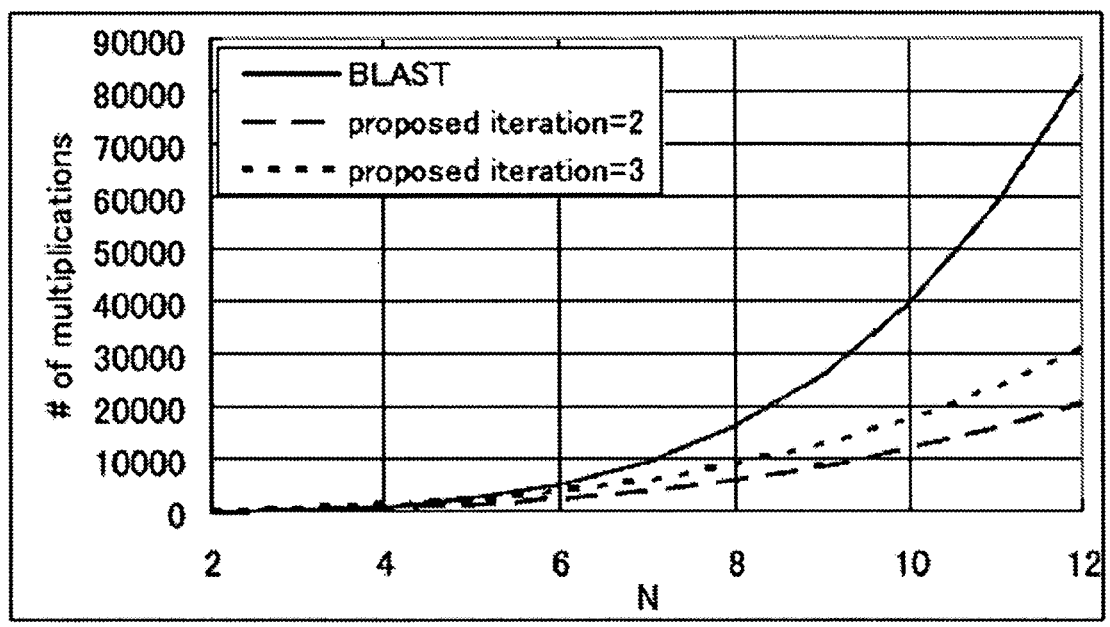
F I G. 1 0 A
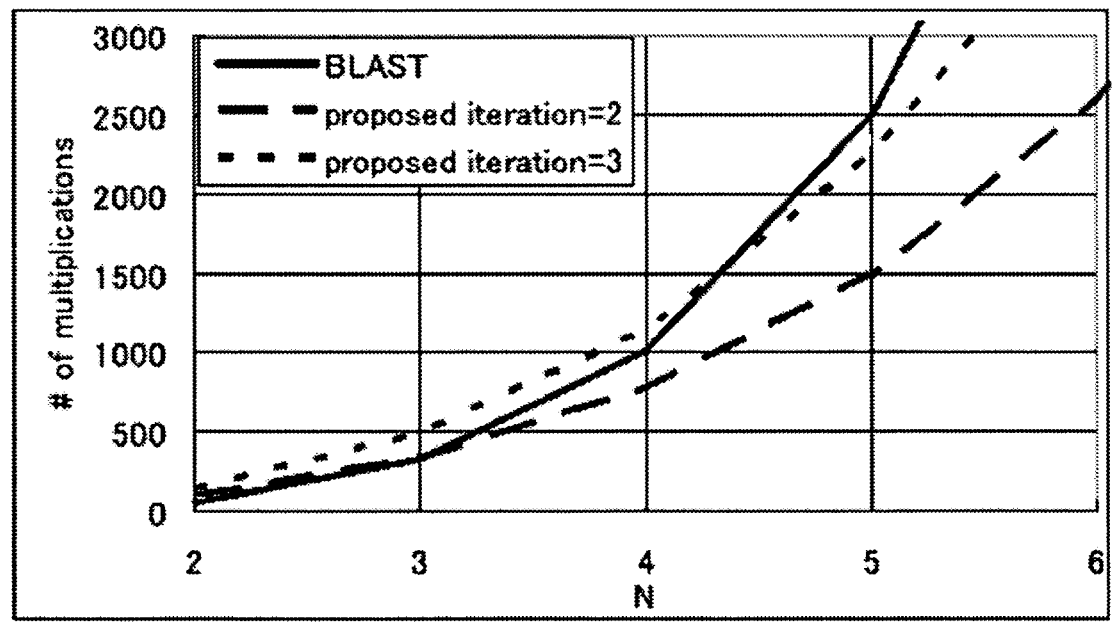
F I G. 1 0 B

| MIMO CONFIGURATION (Tx, Rx) | ANTENNA (N) | BLAST SCHEME | PROPOSED SCHEME ITERATION=2 | PROPOSED SCHEME ITERATION=3 |
|---|---|---|---|---|
| 2*2 | 2 | 48 | 96 | 144 |
| 3*3 | 3 | 243 | 324 | 486 |
| 4*4 | 4 | 768 | 768 | 1152 |
| 5*5 | 5 | 1875 | 1500 | 2250 |
| 6*6 | 6 | 3888 | 2592 | 3888 |
| 7*7 | 7 | 7203 | 4116 | 6174 |
| 8*8 | 8 | 12288 | 6144 | 9216 |
| 9*9 | 9 | 19683 | 8748 | 13122 |
| 10*10 | 10 | 30000 | 12000 | 18000 |
| 11*11 | 11 | 43923 | 15972 | 23958 |
| 12*12 | 12 | 62208 | 20736 | 31104 |

FIG. 11

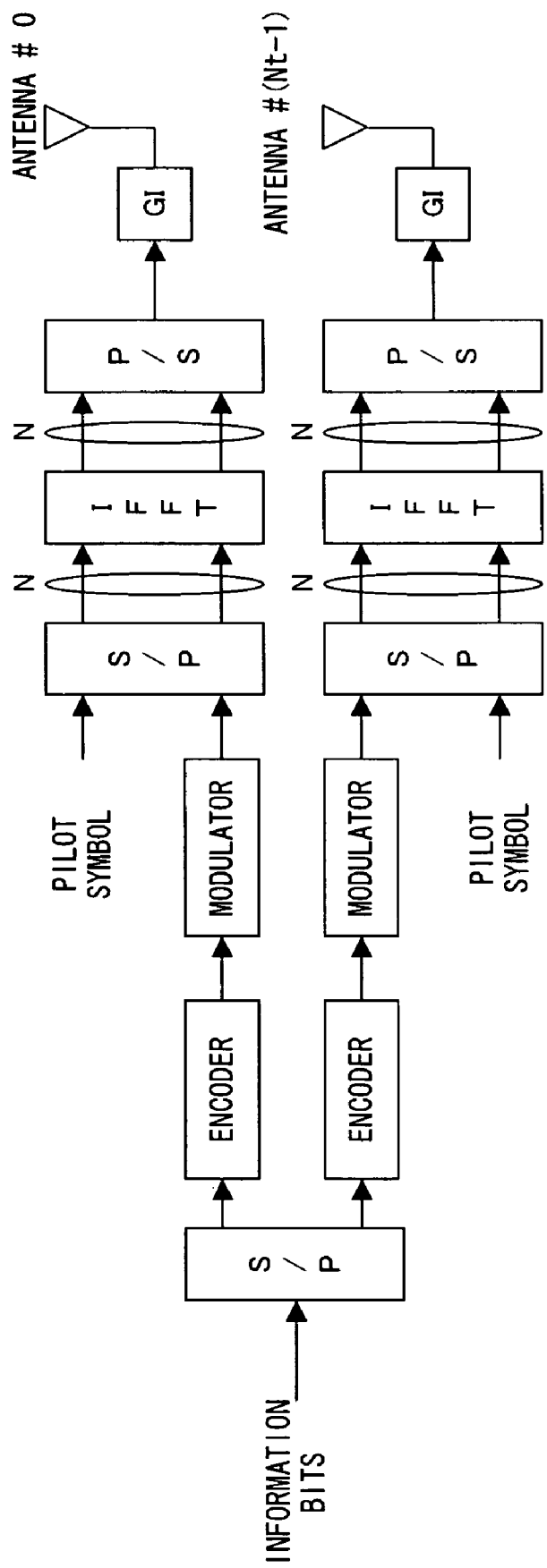
F I G. 13

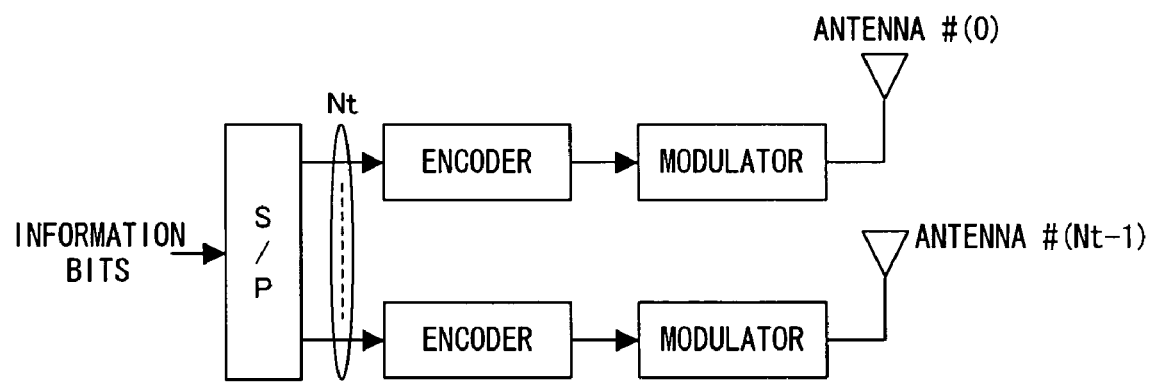
F I G. 1 7 A
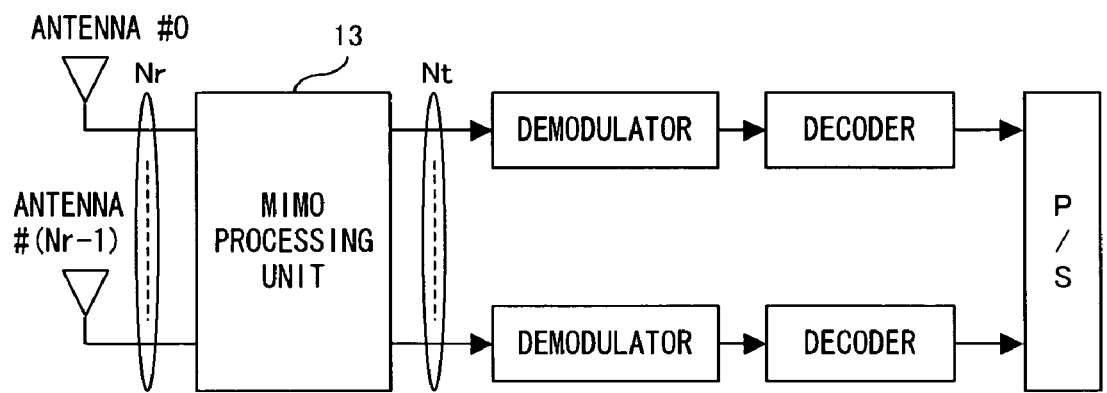
F I G. 1 7 B

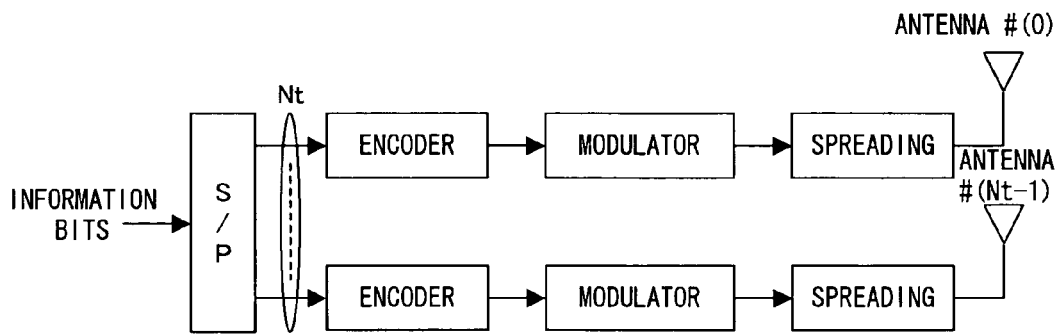
F I G. 1 9 A
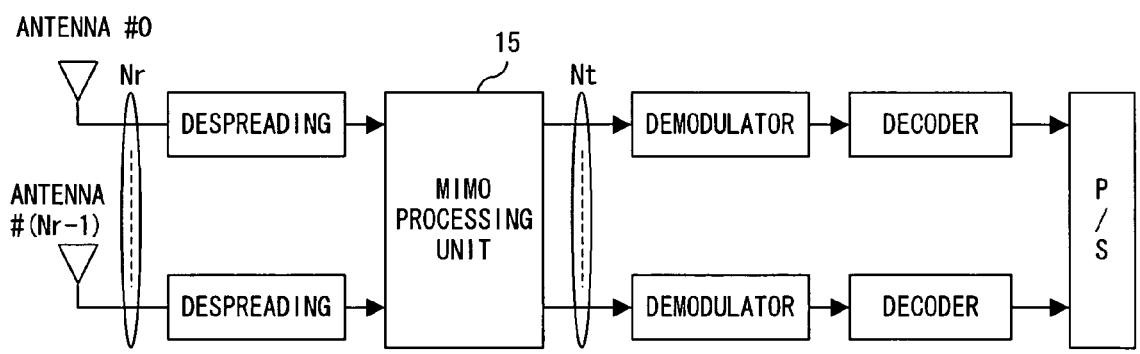
F I G. 1 9 B

SIGNAL RECEIVING METHOD IN MIMO SYSTEM AND DEVICE THEREFOR

BACKGROUND OF THE INVENTION

1. Field of the Invention

The present invention relates to a system which performs radio communication utilizing a plurality of antennas. In particular, the present invention relates to a technology which compensates channels of a MIMO system in the receiver.

2. Description of the Related Art

MIMO (Multi Input Multi Output) is known as a technology for realizing high-speed radio communication. MIMO is one of the space division multiplex communication systems, and is technology wherein a receiving device and a transmitting device are each provided with a plurality of antennas, and a plurality of radio waves, separated by space, are transmitted in parallel with each other. Here, the plurality of radio waves transmitted from the plurality of the antennas generally have the identical frequency to increase frequency utilization efficiency.

FIG. 1 is a basic configuration diagram of the MIMO system. In FIG. 1, the transmitting device transmits signals utilizing Nt transmitting antennas, and the receiving device receives the signals from the transmitting device utilizing Nr receiving antennas. In this case, the characteristics of the channels between the transmitting device and the receiving device are expressed by $H_{0,0}$ to $H_{Nr-1, Nt-1}$. "$H_{0,0}$" indicates the channel characteristics (for example, channel frequency response) for transmitting signals from the transmitting antenna 0 to the receiving antenna 0. "$H_{Nr-1, Nt-1}$" indicates the channel characteristics for transmitting signals from the transmitting antenna Nt−1 to the receiving antenna Nr−1.

Then, signal y, obtained through each receiving antenna in the receiving device, is expressed by the following formula (1). In addition, transmitted symbol x comprises symbols $x_0$ to $x_{Nt-1}$, which are transmitted using the transmitting antennas $N_0$ to $N_{Nt-1}$. Likewise, received signal y comprises signals $y_0$ to $y_{Nr-1}$, which are received using the receiving antennas $N_0$ to $N_{Nr-1}$. The transmitted symbol x and the received signal y are each expressed by a complex vector. In addition, channel status information H is expressed by Nt×Nr matrix. Furthermore, "n" is noise in each receiving antenna.

$$\vec{r} = \overline{\overline{H}} \cdot \vec{x} + \vec{n} \quad (1)$$

With:

$$\vec{r} = [r_0 \ldots r_{Nr-1}]^T, \overline{\overline{H}} = \{H_{p,q}\}_{\substack{0 \leq p < Nr \\ 0 \leq q < Nt}} \vec{x} = [x_0 \ldots x_{Nt-1}]^T \text{ and}$$

$$\vec{n} = [n_0 \ldots n_{Nr-1}]^T$$

"r", which appears in formula (1) and some of the subsequent formulas, indicates received signal and expresses the same as what is described as "y".

The MIMO processing described by the formula (1) is performed for every symbol. In addition, the MIMO system is, for example, described in Patent Document 1 (Japanese Patent Laid-Open Publication No. 2002-44051).

<Non-encoded MIMO>

Non-encoded MIMO can increase data rate by utilizing layering processing, in contrast to encoded MIMO such as Space Time Block Coding and Space Frequency Block Coding. These technologies are described in the following Document 1 (A. Van Zelst, "Space division multiplexing algorisms" Proc. $10^{th}$ Med. Electrotechnical Conference 2000, pp. 1218-1221).

Before describing the five common MIMO signal processing technologies, the channel capacity in MIMO transmission is described briefly. Here, "H" is a matrix which expresses statuses of a plurality of channels.

If the channel matrix H is known in the receiving device, Shannon limit in the space division multiplex system is expressed by the following formula (2). Here, "$I_{Nr}$" is an identity matrix of Nr-dimension. In addition, "ρ" is the SNR (Signal Noise Ratio) of the signal transmitted from each transmitting antenna. Furthermore, "$H^H$" is a Hermitian Matrix of H.

$$C = \log_2\left(I_{N_r} + \frac{\rho}{N_t}\overline{\overline{HH^H}}\right) bps/Hz \quad (2)$$

The following two assumptions are introduced to perform the MIMO processing.

Assumption 1: Regarding System Design

In order to mathematically find a solution, the MIMO system must be designed under the condition of "Nr>=Nt". Namely, the number of receiving antennas is equal to or larger than the number of transmitting antennas.

Assumption 2: Regarding Channel Status

Each transmitting antenna and receiving antenna must be uncorrelated or partially uncorrelated. Namely, it is prohibited for all elements in the channel matrix H to coincide with each other. This condition is met in an environment where uncorrelated fading exists or in an environment where scattering is rich.

Next, the five common MIMO signal processing technologies are described.

<Zero Forcing Algorithm>

In the Zero Forcing Algorithm, the estimated value $x^{est}$ of the transmitted signal, in the receiving device, is obtained by the following formula (3). Here, "$H^+$" is the pseudo inverse matrix of H. If H is a square matrix, "$H^+ = H^{-1}$".

$$\vec{x}^{est} = H^+ \cdot \vec{r} \quad (3)$$

<MMSE (Minimum Mean Square Error) Algorithm>

In the MMSE Algorithm, the estimated value $x^{est}$ of the transmitted signal in the receiving device is obtained by the following formula (4). In formula (4), "α" indicates "1/SNR", and "I" indicates identify matrix. In addition, "$H^{+}$" is the transposed conjugate matrix of H.

$$\vec{x}^{est} = (\alpha I + H^*H)^{-1}H^* \vec{r} \quad (4)$$

The MMSE Algorithm is described in the following Document 2 (J. Proakis, Digital Communications, 3rd ed. McGraw-Hill 1995).

<ZF-BLAST (Zero Forcing Bell Laboratories Layered Space Time) Algorithm>

The BLAST is intended to realize high-speed data communication over multiple transmitting antennas. According to this algorithm, synchronously transmitted symbols utilizing the Nt transmitting antennas are detected. Signals transmitted from each transmitting antenna are selected and estimated by suppressing/canceling interference. This canceling step is repeated Nt-1 times. Decoding procedures are described below.

The following conditions are set in the first decoding step (u=1). In addition, "~" mark indicates an estimated value. Furthermore, "=" mark, which is superscripted to H, indicates that H is a matrix.

$$H_1 = \tilde{H} \text{ and } \vec{r}_1 = \vec{r}$$

Nulling matrix G is calculated by each step u. Here, the nulling matrix Gu in the u-th decoding step is expressed by the following formula (5). Namely, the nulling matrix Gu in the u-th decoding step is the pseudo inverse matrix of the estimated value of H matrix in the u-th decoding step.

$$G_u = \tilde{H}_u^+ \quad (5)$$

In the BLAST algorithm, an arbitrary layer can be selected from the nulling matrix G in every step u. However, according to the Document 2, optimal performance is obtained if the layer indicating the maximum post detection signal to noise ratio is selected. This condition is equivalent to the selection of a row which has minimum norm on its diagonal from the nulling matrix G.

In the u-th decoding step, the processing wherein the row which has the minimum norm from the nulling matrix Gu is selected is expressed by the following formula (6) or formula (7). "ku" identifies the row which is to be selected from the nulling matrix Gu and indicates the corresponding transmitting antenna. In addition, "$w_{ku}$" represents a vector comprising each component of the ku-th row in the nulling matrix Gu.

$$k_u = \underset{j \in \{1, N_1 - u + 1\}}{\arg\min} \|(G_u)_j\|^2 \quad (6)$$

$$\vec{w}_k = (G_u)_{k_u}^T \quad (7)$$

If "$w_{ku}$" obtained in formula (7) is multiplied by the received signal vector $y_u$, all of the layers other than the layer corresponding to the transmitting antenna ku are suppressed. In this case, the following formula (8) is obtained. Here, "$x_{ku}$" represents the transmitted signal and "est" indicates that it is an estimated value.

$$x_{k_u}^{est} = \vec{w}_{k_u}^T \cdot \vec{r}_u \quad (8)$$

If one layer is detected, the processing for detecting subsequent layers can be advanced. The number of layers to be targeted in the next step can be reduced by one, by deducting a part of the detected signals from the received signal vector. Namely, the variations of the received vector is expressed by the following formula (9). "Q" indicates a slicing value of the received symbol. "$y_u$" and "$y_{u+1}$" represents the received signal in the "u"th step and the received signal in "u+1"th step, respectively. "$(H_u)^{ku}$" indicates the ku-th row in the H matrix in the "u"th step (namely, the row comprising the coefficient showing the status of the channel relative to the transmitting antenna ku).

$$\vec{y}_{u+1} = \vec{y}_u - Q(x_{k_u}^{est}) \cdot (\tilde{H}_u)^{k_u} \quad (9)$$

Then, since the ku-th row in channel "$(H_u)^{ku}$" is no longer required, this row is removed. This processing can be expressed by the following formula (10).

$$\tilde{H}_{u+1} = \tilde{H}_u^{k_u} \quad (10)$$

In the BLAST algorithm, the processing of the formulas (6) through (10) are repeatedly executed until "u=Nt" is fulfilled, while incrementing "u" one by one. Namely, the processes in the formulas (6) through (10) are repeatedly executed by the number of transmitting antennas. The BLAST Algorithm is described in the following Document 3 (P. W. Wolniansky and al., "V-BLAST: An architecture for realizing very high data rates over the rich scattering wireless channel", in Proc. Int. Symposium on Advanced Radio Technologies, Boulder, Colo., September 1998).

<MMSE-BLAST Algorithm>

The principle of the MMSE-BLAST algorithm is basically the same as that of the ZF-BLAST algorithm. However, in the MMSE-BLAST algorithm, the following formula (11) is used in place of the afore-mentioned formula (5). "α" indicates the variance of noise.

$$G = (\alpha I + H^*H)^{-1} H^* \quad (11)$$

<Maximum Likelihood Decoding Algorithm>

In the Maximum Likelihood Decoding algorithm, the received signal y is compared with all possible transmitted vectors (specifically, all the transmitted vectors varied by Channel H) and the transmitted data is estimated based on the Maximum Likelihood principle. This method can be expressed by the following formula (12).

$$\vec{x}^{est} = \arg\min \|\vec{y} - Hx_j\|^2 \; x_j \in \{s_1, \ldots, s_k\} \quad (12)$$

The Maximum Likelihood Decoding algorithm is one of the optimum methods for regenerating transmitted data. However, in this algorithm, since the transmitted vectors estimated from the received signals and all possible transmitted vectors must be compared, a problem exists in that the computational effort becomes very large. For example, if it is assumed that the modulation system is BPSK, 16 (=$2^4$) transmitted vectors exist in a system which has four transmitting antennas, and 32 (=$2^5$) transmitted vectors in a system which has five antennas. Namely, the number of transmitted vectors estimated from the received signals and the number of vectors to be compared are inevitably increased exponentially as the number of transmitting antennas increases.

If the afore-mentioned five conventional technologies are applied to the MIMO system, the following problem occurs. Namely, in the Zero Forcing algorithm and MMES algorithm, the estimation accuracy of the transmitted symbol is low, resulting in low decoding performance.

In the BLAST algorithm and Maximum Likelihood Decoding algorithm, the estimation accuracy of the transmitted symbol is high. In particular, the Maximum Likelihood Decoding algorithm is an optimum algorithm if attention is paid to decoding performance. However, the calculations of these algorithms are complicated and the load to the receiving device is heavy. For example, the computational effort of the Maximum Likelihood Decoding algorithm exponentially increases with respect to the number of the status (dependant on the number of transmitting antennas and the modulation system).

SUMMARY OF THE INVENTION

The objective of the present invention is to obtain high decoding performance while suppressing the complexity of the decoding processing within a receiving device wherein signals are received by using a plurality of antennas.

The receiving device according to the present invention comprises; an estimation unit for estimating a transmitted symbol from the received signals using a plurality of antennas according to a status of channels transmitting signals from a transmitting device; a likelihood calculation unit for calculating a likelihood of the transmitted symbol estimated by the estimation unit; and an iteration unit for causing the estimation unit and the likelihood calculation unit to repeatedly perform the estimation and the calculation while providing information indicating the likelihood to the estimation unit. The estimation unit estimates the transmitted symbol according to the information indicating the likelihood in a second or subsequent estimation.

In the receiving device, processing to newly estimate transmitted symbols is repeatedly performed, according to the information indicating the likelihood of the estimated transmitted symbols. Therefore, if the number of repetition is increased, the estimation accuracy of the transmitted symbol becomes higher.

The estimation unit may estimate the transmitted symbol using the Minimum Mean Square Error algorithm. In this case, since the computation effort per one estimation processing is relatively small, the load to the receiving device is not very heavy, even if the estimation processing is repeated.

According to the present invention, excellent decoding performance can be obtained using an algorithm wherein the complexity of the decoding processing is suppressed, in a receiving device wherein the signals are received by using a plurality of antennas.

BRIEF DESCRIPTION OF DRAWINGS

FIG. 3 is a diagram explaining a signal regeneration unit comprised in a receiving device;

FIG. 5 is a flowchart (2) showing an operation of a signal regeneration unit;

FIG. 6 is a list describing the algorithms in the embodiments;

FIG. 7 is a diagram showing the simulation results regarding error rate (1);

FIG. 8 is a diagram showing the simulation results on the error rate (2);

FIG. 9 is a table comparing the number of multiplications;

FIGS. 10A and 10B are diagrams comparing the numbers of multiplication;

FIG. 11 is a table comparing the number of additions;

FIG. 13 is a configuration diagram of a MINO-OFDM transmitter;

FIG. 17A is a configuration diagram of the transmitter in a third embodiment;

FIG. 17B is a configuration diagram of the receiver in a third embodiment;

FIG. 19A is a configuration diagram of the transmitter in a fifth embodiment; and FIG. 19B is a configuration diagram of the receiver in a fifth embodiment.

DESCRIPTION OF THE PREFERRED EMBODIMENTS

Figure 1:
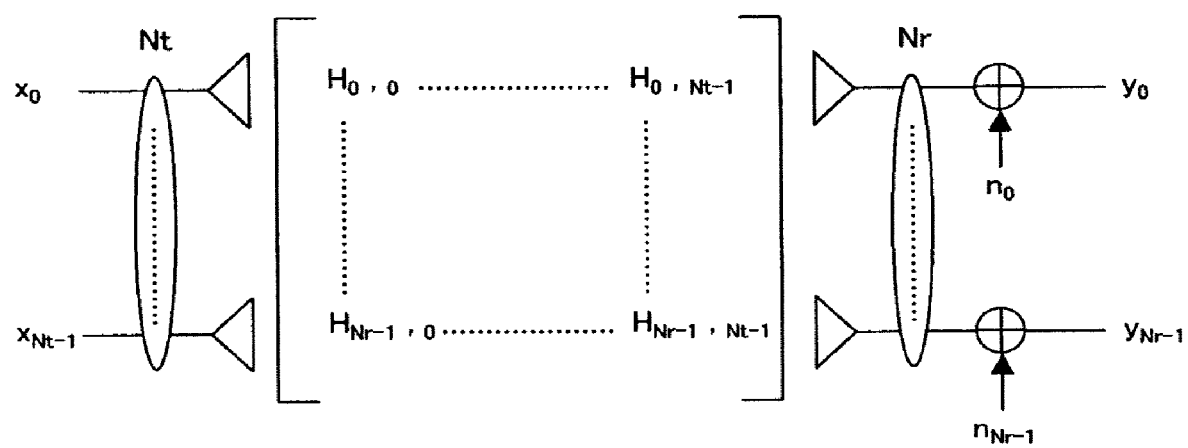
FIG. 1 is a basic configuration diagram of a MIMO system.
Figure 2:
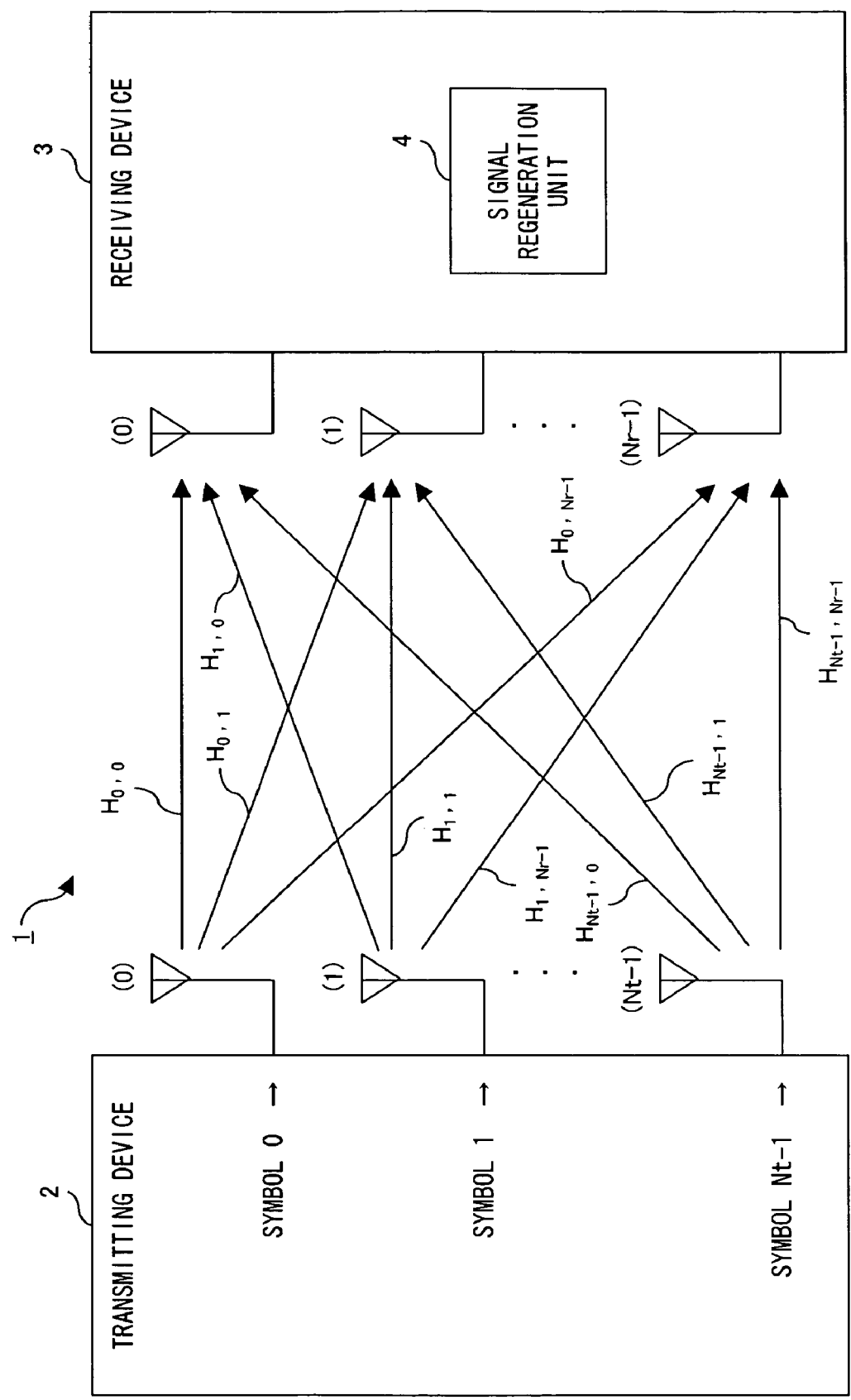
FIG. 2 is a diagram showing a configuration of the MIMO system in an embodiment according to the present invention.

FIG. 2 is a diagram showing the configuration of a MIMO system in an embodiment according to the present invention. MIMO system 1 comprises a transmitting device (transmitter) 2 which comprises a plurality of transmitting antennas and a receiving device (receiver) 3 which comprises a plurality of receiving antennas.

The transmitting device 2 transmits a plurality of symbols in parallel using Nt transmitting antennas. In the example shown in FIG. 2, symbol 0 through symbol Nt−1 are transmitted in parallel. The plurality of symbols transmitted in parallel may be created from one data stream or different data streams. In addition, each transmitted symbol corresponds to, for example, one-bit data if the modulation method is BPSK, and corresponds to two-bit data if the modulation method is QPSK.

The receiving device 3 receives the signals transmitted from the transmitting device 2 using Nr receiving antennas. Here, the number of receiving antennas is equal to or greater than that of the transmitting antennas provided at the transmitting device 2. Namely, it is determined to be "Nr>=Nt". In addition, the receiving device 3 comprises a signal regeneration unit 4 which regenerates the transmitted symbols from the signals received through the plurality of the receiving antennas.

In the MIMO system 1, the signals transmitted from the plurality of transmitting antennas are received by the plurality of receiving antennas. In other words, for example, the signals transmitted from the transmitting antenna (0) are received by receiving antennas (0) through (Nr−1), and likewise, the signals transmitted from the transmitting antennas (Nt−1) are also received by the receiving antennas (0) through (Nr−1). In this case, the status (or characteristics) of the channel which propagates the signals from the i-th transmitting antenna to the j-th receiving antenna is expressed as "$H_{ij}$". Then, a plurality of channels between the transmitting device 2 and the receiving device 3 can be expressed by Nt×Nr matrix. Hereinafter, this matrix may be called "Channel Matrix H".

The receiving device 3 detects each component in the channel matrix H prior to communication. The receiving device 3 detects each component in the channel matrix H by, for example, the following steps. The transmitting device 2 first transmits a pilot signal using the transmitting antenna (0). The receiving device 3 receives the pilot signal transmitted from the transmitting antenna (0) through the receiving antennas (0) to (Nr−1). In this case, since the transmitting power of the pilot signal is determined in advance, the receiving device 3 obtains each component ($H_{0,0}$~$H_{0,Nr-1}$) of the first row in the channel matrix by monitoring the power, SNR, and the like of the signal received through the receiving antennas (0) to (Nr−1). Thereafter, each component of the 2nd to Nt-th rows in the channel matrix can be obtained, in the same way, by using the pilot signal transmitted from each transmitting antenna.

In the MIMO system 1, if the symbol x ($x_0$~$x_{Nt-1}$) is transmitted from the transmitting device 2, the signal y ($y_0$~$y_{Nr-1}$) detected in the receiving device 3 is expressed by the formula (1). Therefore, if noise n is zero, the receiving device 3 can obtain correct transmitted symbols by detecting the channel matrix H. Namely, the receiving device 3 can obtain the transmitted symbol x from the received signal y by performing an inverse operation corresponding to the influence of each component in the channel matrix H to the signal. Hereinafter, the concept comprising this inverse operation may be called "compensation" or "channel compensation". However, noise n is generally not zero. In addition, the channel matrix H cannot be determined with absolute accuracy. Therefore, the receiving device 3 estimates the transmitted symbol from the received signal y and the channel matrix H and introduces an algorithm for minimizing the error of this estimated value.

FIG. 3 is a diagram explaining the signal regeneration unit 4 comprised in the receiving device 3. The received signal (y: $y_0$~$y_{Nr-1}$), CSI (Channel State Information), and the variance of noise are given to the signal regeneration unit 4. Here, the received signals are received through receiving antennas (0) through (Nr−1) shown in FIG. 2. In addition, channel status information are components of the channel matrix H, explained in reference to FIG. 2. Furthermore, the variance of noise is, for example, "1/SNR", and is found in advance, prior to demodulation.

The signal regeneration unit 4 estimates each transmitted symbol in accordance with the received signals, channel status information, the variance of noise, and the likelihood of the previous estimated value, and updates the likelihood of the estimated value. The likelihood of the estimated value is expressed by LLR (Log Likelihood Ratios), in this example.

Figure 4:
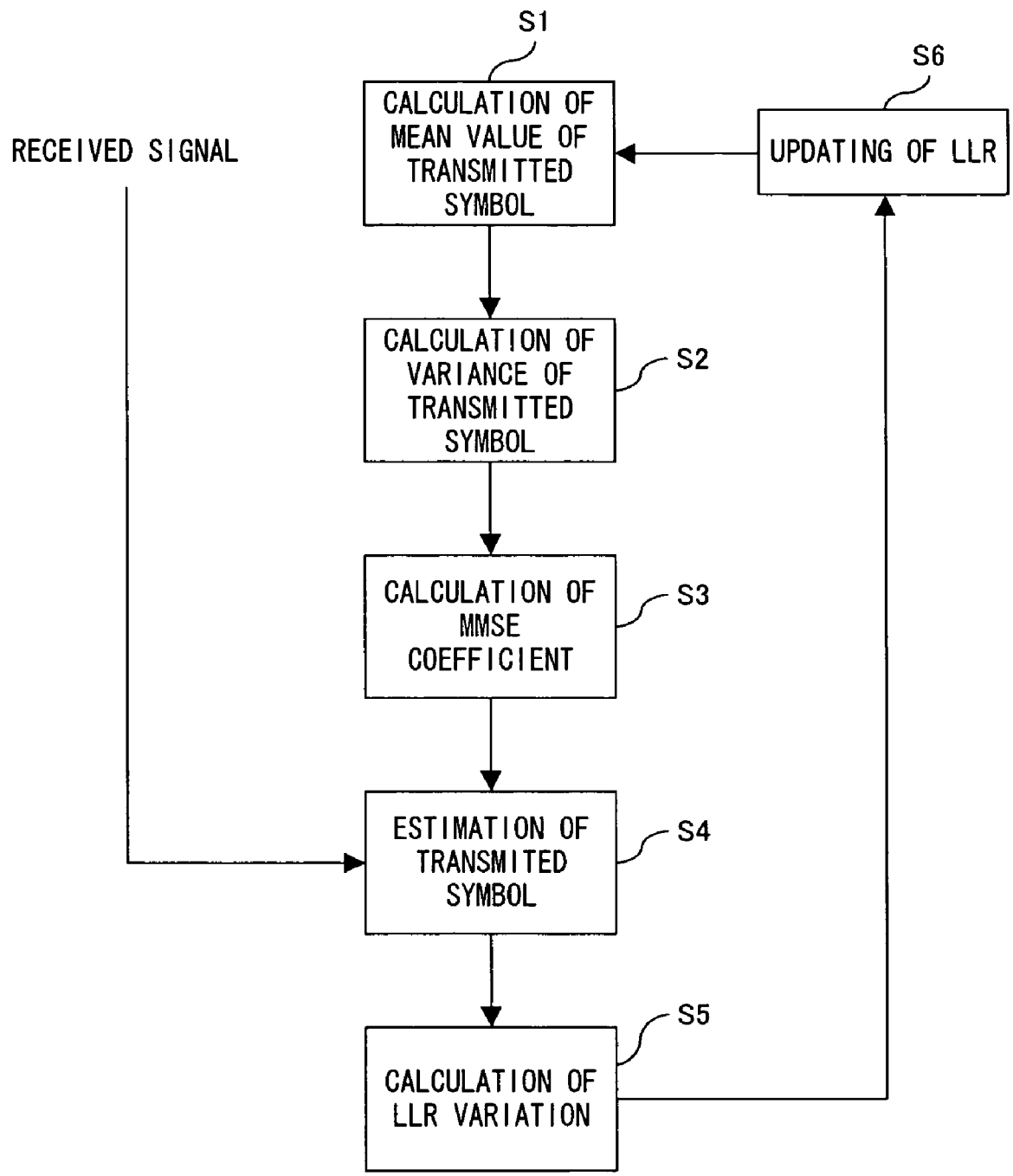
FIG. 4 is a flowchart (1) showing an operation of a signal regeneration unit.

FIG. 4 and FIG. 5 are flowcharts showing the processing of the signal regeneration unit 4. Here, FIG. 4 and FIG. 5 describe the same operation.

The signal regeneration algorithm in the embodiment estimates the transmitted symbol by repeatedly executing the steps S1 to S6 shown in FIG. 4 or FIG. 5, twice or more. In addition, the channel matrix H and the variance α of noise are determined to be detected beforehand in these flowcharts. In addition, in the explanations hereinafter, "(i)" indicates the i-th iterative cycle. "k" identifies the transmitting antenna. "^" mark indicates estimated value.

In step S1, the mean value of the transmitted symbol is calculated using the log likelihood ratio (LLR) obtained in step S6 described later. However, the predetermined initial value is used for the mean value of the transmitted symbol in the first iterative cycle. For example, if the signal is modulated with BPSK, "0" is set as the initial value of the mean value since the transmitted symbol is "+1" or "−1".

In step S2, the variance of the transmitted symbol is calculated using the mean value of the transmitted symbol obtained in step S1. However, the predetermined initial value is also used for the variance of the transmitted symbol in the first iterative cycle. The initial value of the variance of the transmitted symbol is set according to the modulation method. For example, if the signal is modulated with BPSK, "1" is set as the initial value of the variance.

In step S3, the MMSE coefficient is calculated using the variance of the transmitted signals obtained in step S2, the channel matrix H, and the variance α of noise. The MMSE coefficient is a matrix (or its components) used to estimate the transmitted symbols from the received signals using the Minimum Mean Square Error algorithm and is a coefficient for channel compensation.

In step S4, the transmitted symbols are regenerated from the received signals using the MMSE coefficient obtained in step S3.

In step S5, the variation ΔL of log likelihood ratio (LLR) is calculated using the estimated value obtained in step S4. In this case, the error is determined to be that of Gaussian distribution.

In step S6, the log likelihood ratio (LLR) calculated in the previous iterative cycle is updated using the variation ΔL. Here, the log likelihood ratio (LLR) is a parameter indicating the likelihood of the estimated value of the transmitted symbol. The log likelihood ratio (LLR) newly obtained in the "i"th iterative cycle is used in the "i+1"th cycle.

The signal regeneration algorithm in this embodiment repeatedly performs the steps S1 through S6 twice or more. The log likelihood ratio (LLR), the mean value of the transmitted symbol, and the variance of the transmitted symbol are updated every iterative cycle, and the transmitted symbol is estimated in accordance with the updated results. Therefore, the estimated accuracy of the transmitted symbol becomes higher as the repetition count of the processing in steps S1 through S6 becomes higher.

Although the repetition count is not particularly limited, it can be determined so as to obtain desired decoding characteristics by simulation and the like. Alternatively, the decoding error rate may be monitored and the iterative processing may be suspended when the error rate value becomes smaller than a predetermined threshold value.

In addition, in the flowcharts in FIG. 4 and FIG. 5, the processing in steps S1 through S4 are the same as the existing Minimum Mean Square Error algorithm. However, in the existing Minimum Mean Square Error algorithm, neither the procedure for calculating the log likelihood ratio (LLR) from the estimated value of the transmitted symbol nor the procedure for repeatedly estimating the transmitted symbol using the log likelihood ratio (LLR) exists. Namely, one of the characteristics of the algorithm in this embodiment is that the estimation accuracy is heightened by utilizing the log likelihood ratio (LLR) to repeatedly estimate the transmitted symbol.

Next, the specific calculation method of the algorithm in this embodiment is described in detail. In the following descriptions, "E {a}" represents the mean value of "a". In addition, "$X_k$" marked with "^" expresses the estimated value of the symbol transmitted from the k-th transmitting antenna.

In the MMSE (Minimum Mean Square Error) algorithm, generally, a solution minimizing a cost function is obtained. If the MMSE (Minimum Mean Square Error) algorithm is applied to the signal regeneration processing in this embodiment, the cost function is as follows:

$$\text{CostFunction} = E(|x_k - \hat{x}_k|^2)$$

Minimizing this cost function and obtaining the solution of the MMSE algorithm is equivalent to the following formulas (13) and (14). Here, formula (13) describes the symbol transmitted from the k-th transmitting antenna, and formula (14) describes the entire MIMO system.

$$\hat{x}_k = \bar{x}_k + Cov(x_k, \vec{y}) \cdot Cov(\vec{y}, \vec{y})^{-1} \cdot (\vec{y} - E\{\vec{y}\}) \quad (13)$$

$$\hat{\vec{x}} = \bar{\vec{x}} + Cov(\vec{x}, \vec{y}) \cdot Cov(\vec{y}, \vec{y})^{-1} \cdot (\vec{y} - E\{\vec{y}\}) \quad (14)$$

"Cov" is an operator which calculates Covariance. For example, if the mean values of the probability variables X1 and X2 are μ1 and μ2, this operator means the following:

$$Cov(X1, X2) = \{(X1-\mu 1)(X2-\mu 2)\}$$

The method for obtaining formula (13) or formula (14) in the MMSE algorithm are described in, for example, the Document 4 (M. Tuchler and al., "Minimum mean square error equalization using a priori information", IEEE Trans. Comm., March 2002).

If "Cov (x, y)" and "Cov (y, y)" comprised in formula (14) are simplified by using the formula (1), they are described in the following formula (15) and formula (16), respectively.

$$\text{Cov}(\vec{y},\vec{y}) = \overline{H} \cdot \text{Cov}(\vec{x},\vec{x}) \cdot \overline{H}^H + \alpha^2 I_{Nr} \tag{15}$$

$$\text{Cov}(\vec{x},\vec{y}) = E\{\vec{x} \cdot (\overline{H} \cdot \vec{x} + \vec{n})^H\} = \text{Cov}(\vec{x},\vec{x}) \cdot \overline{H}^H \tag{16}$$

Furthermore, the matrix V shown in the following formula (17) is defined. The matrix V is a diagonal matrix obtained by "Cov (x, x)". Therefore, each component on the diagonal of this matrix V is equivalent to the variance of the symbol transmitted from the corresponding transmitting antenna.

$$\overline{V}_{Nt*Nt} = \text{Cov}(\vec{x},\vec{x}) = \text{diag}(v_0, \ldots, v_k, \ldots, v_{Nt-1}) \tag{17}$$

with $v_k = \text{Cov}(x_k, x_k)$

If formula (15) and formula (16) are assigned to formula (14), the following formula (18) is obtained.

$$\vec{\hat{x}} = E\{\vec{x}\} + \overline{\overline{G}} \cdot (\vec{y} - \overline{H} \cdot E\{\vec{x}\}) \tag{18}$$

Where:

$$\overline{\overline{G}} = \frac{\overline{V} \cdot \overline{H}^H}{\overline{H} \cdot \overline{V} \cdot \overline{H}^H + \alpha^2 I_{Nr}} \tag{19}$$

Thus, according to the algorithm in this embodiment, the transmitted symbol is estimated using the mean value of the transmitted symbols, a matrix G, the received signal y, and the channel matrix H. Here, the matrix G includes the variances of the transmitted symbols. Namely, the estimation of the transmitted symbol depends on the mean and variance of each transmitted symbol. Therefore, Gaussian distribution is introduced for this estimation in the algorithm of this embodiment. Then, conditional probability is described by the following formula (20). In this case, "$\mu_k$" is the mean value of the estimated values of the symbols transmitted from the k-th transmitting antenna. In addition, "$\sigma_k^2$" is the variance of the estimated values of the symbols transmitted from the k-th transmitting antenna.

$$P(\hat{x}_k / x_k = b) \propto \exp\left(-\frac{(\hat{x}_k - \mu_k(b))^2}{\sigma_k^2(b)}\right) \tag{20}$$

Where:

$$\begin{cases} \mu_k(b) = E\{\hat{x}_k / x_k = b\} \\ \sigma_k^2(b) = \text{Cov}(\hat{x}_k, \hat{x}_k / x_k = b) \end{cases} \tag{21}$$

Furthermore, the log likelihood ratio (LLR) of the transmitted symbol is defined by the following formula (22) using the conditional probability of formula (20). Here, "$\Delta L(x_k)$" is defined by the logarithm of the ratio of the probability when the symbol transmitted from the k-th transmitting antenna is "+1" and the probability when the symbol transmitted from the k-th transmitting antenna is "−1". It is equivalent to the variation between the log likelihood ratio (LLR) in a certain cycle and that in the next cycle.

$$\begin{cases} L^{(i)}(x_k) = L(x_k / \hat{x}_k^{(i)}) \\ \Delta L(x_k) = \ln \frac{P(\hat{x}_k / x_k = +1)}{P(\hat{x}_k / x_k = -1)} \end{cases} \tag{22}$$

Then, the log likelihood ratio (LLR) in the "i+1"th cycle is obtained by updating the log likelihood ratio (LLR) in the "i"th cycle with "ΔL", as shown in the following formula (23)

$$L^{(i+1)}(x_k) = L^{(i)}(x_k) + \Delta L(x_k) \tag{23}$$

Here, the signal is assumed to be modulated with BPSK in the MIMO system of this embodiment. Then, since the transmitted symbol can only be "+1" and "−1", the relation of the following formula (24) is obtained.

$$\begin{cases} \mu_k(+1) = -\mu_k(-1) = \mu_k \\ \sigma_k^2(-1) = \sigma_k^2(+1) = \sigma_k^2 \end{cases} \tag{24}$$

If formula (20) and formula (24) are assigned to the formula (22), the following formula (25) is obtained.

$$\Delta L(x_k) = \frac{|\hat{x}_k + \mu_k|^2 - |\hat{x}_k - \mu_k|^2}{\sigma_k^2} \tag{25}$$

Furthermore, if formula (25) is calculated, the following formula (26) is obtained as the variation of the log likelihood ratio (LLR). "Re ( )" represents the operator which fetches the real part of the imaginary number to be described within the parenthesis.

$$\Delta L(x_k) = 4 \cdot \frac{\mu_k}{\sigma_k^2} \cdot \text{Re}(\hat{x}_k) \tag{26}$$

Here, the modulation method of the MIMO system is assumeed to be BPSK. In addition, the mean value and the variance of the symbols transmitted from the k-th transmitting antenna are "0" and "1", respectively. In this case, formula (21) is described by the following formula (27). Furthermore, in this case, the variation ΔL of the log likelihood ratio (LLR) is described by the following formula (28). "$h_{jk}$" and "$h_{kj}$" are components in the channel matrix H. "$g_{jk}$" and "$g_{kj}$" are components in the matrix G expressed by formula (19), as well.

$$\begin{cases} \mu_k = \sum_{j=0}^{Nr-1} g_{k,j} \cdot h_{j,k} \\ \sigma_k^2 = \sum_{j=0}^{Nr-1} g_{k,j} \cdot h_{j,k} \cdot \left(1 - \sum_{j'=0}^{Nr-1} h_{k,j'}^* \cdot g_{j',k}^*\right) \end{cases} \tag{27}$$

$$\Delta L(x_k) = 4 \cdot \frac{\text{Re}(\hat{x}_k)}{\left(1 - \sum_{j=0}^{Nr-1} h_{k,j}^* \cdot g_{j,k}^*\right)} \tag{28}$$

The mean value of the transmitted symbol x in the "i"th cycle can be defined by the following formula, if the modulation method of the MIMO system is BPSK.

$$\overline{x}_k^{(i)} = (+1)P(\hat{x}_k/x_k=1) + (-1)P(\hat{x}_k/x_k=-1) \forall k$$

Then, the following formula (29) can be obtained by assigning the formula (22) to this definition. Furthermore, formula (30) can be obtained from formula (29).

$$\overline{x}_k^{(i)} = \tanh\left(\frac{L^{(i)}(x_k)}{2}\right) \forall k \quad (29)$$

$$v_k^{(i)} = 1 - |\overline{x}_k^{(i)}|^2 \forall k \quad (30)$$

FIG. 6 lists and describes the algorithms in this embodiment, collectively. These formulas are substantially the same as those appeared in the processes from formulas (13) through (30).

Here, the relationship between the flowcharts shown in FIG. 4 or FIG. 5 and the afore-mentioned calculations is explained.

<First Iterative Cycle>

The mean value in step S1 and the variance in step S2 are given as initial values corresponding to the modulation method. The MMSE coefficient (matrix G) in step S3 is calculated by formula (19). Here, the channel matrix H and the variance α of noise are detected in advance. In addition, the variance of the transmitted symbol is obtained in step S2.

In step S4, the estimated value of the transmitted symbol is calculated by formula (18). The received signal y is received through a plurality of receiving antennas. In addition, as the MMSE coefficient (matrix G), the value obtained in step S3 is used.

In step S5, the variation ΔL of the log likelihood ratio is calculated. This variation ΔL is generally obtained by formula (22); if the modulation method of the MIMO system is BPSK, it is obtained by formula (26); and furthermore, if "0" and "1" are given as the mean value and variance of the transmitted symbol, respectively, it is obtained by formula (26).

In step S6, the log likelihood ratio (LLR) is calculated by formula (23). The log likelihood ratio (LLR) obtained in the first iterative cycle will be used in the second iterative cycle.

<Second Iterative Cycle>

In step S1, the mean value of the transmitted symbol is obtained by formula (29), for example, if the modulation method of the MIMO system is BPSK. In this case, as the log likelihood ratio (LLR), that has been obtained in step S6 of the first iterative cycle is used. Subsequently, in step S2, the variance of the transmitted symbol is obtained by formula (30), for example, if the modulation method of the MIMO system is BPSK.

The operation of steps S3 through S6 are the same as the first iterative cycle. However, the log likelihood ratio (LLR) to be used in the third iterative cycle is calculated in the second iterative cycle.

<Third and Subsequent Iterative Cycle>

These cycles are basically the same as the second iterative cycle. The repetition count is, for example, is determined in advance by simulation or the like. Alternatively, the processing may be terminated when a predetermined condition is satisfied. Then, the ultimately obtained estimated value is output as a regenerated transmitted symbol.

Next, the algorithm in the embodiment according to the present invention is compared with that in a related art. The complexity of the decoding performance and algorithm is compared below.

<Decoding Performance>

FIG. 7 and FIG. 8 are diagrams showing simulation results regarding error ratios of the algorithms in this embodiment and in the related art. FIG. 7 shows the result of when four transmitting antennas and four receiving antennas are provided, and FIG. 8 shows the result of when eight transmitting antennas and eight receiving antennas are provided. Furthermore, the simulation was performed under the following conditions:

Carrier frequency: 2.4 GHz
Bandwidth: 20 MHz
Modulation method: BPSK
Symbol: Convolutional code
Coding Ratio: 1/2
Number of data sub-carrier: 52 (=48+4)
Guard interval length: 16 samples
Channel model: 5-path exponential decay
Maximum delay spread: 0.20μ sec
Terminal speed: 0.5 m/sec
Sampling cycle: 0.5μ sec The algorithm in the embodiment according to the present invention can obtain a more superior receiving performance compared to the Zero Forcing algorithm, MMSE algorithm, and ZF-BLAST algorithm. However, it is slightly inferior to the MMSE-BLAST algorithm.

In the algorithm in the embodiment according to the present invention, the error rate of when the repetition count is three times is improved from that of when it is twice. In addition, the characteristics of when the repetition count is identical to the conventional MMSE algorithm.

<Complexity of Algorithms>

Here, the algorithm in the embodiment according to the present invention and the BLAST are compared. The number of calculation performed to estimate the transmitted symbol is reviewed. Furthermore, the MIMO system to be reviewed below is determined to be one wherein both of the number of transmitting antennas and the number of receiving antennas are equal to "N".

The calculations count in BLAST can be expressed as stated below.

Number of multiplications=$4N^4 + F(N^3)$

Number of additions=$4N^4 + F(N^3)$

Where "$F(N^3)$" is a cubic function of "N".

On the other hand, the calculation count in the algorithms in the embodiment according to the present invention can be expressed as below. Here, "K" is the repetition count.

Number of multiplications=$6N^3 + 6(K-1)N^3 = 6KN^3$

Number of additions=$6N^3 + 6(K-1)N^3 = 6KN^3$

Figure 12A:
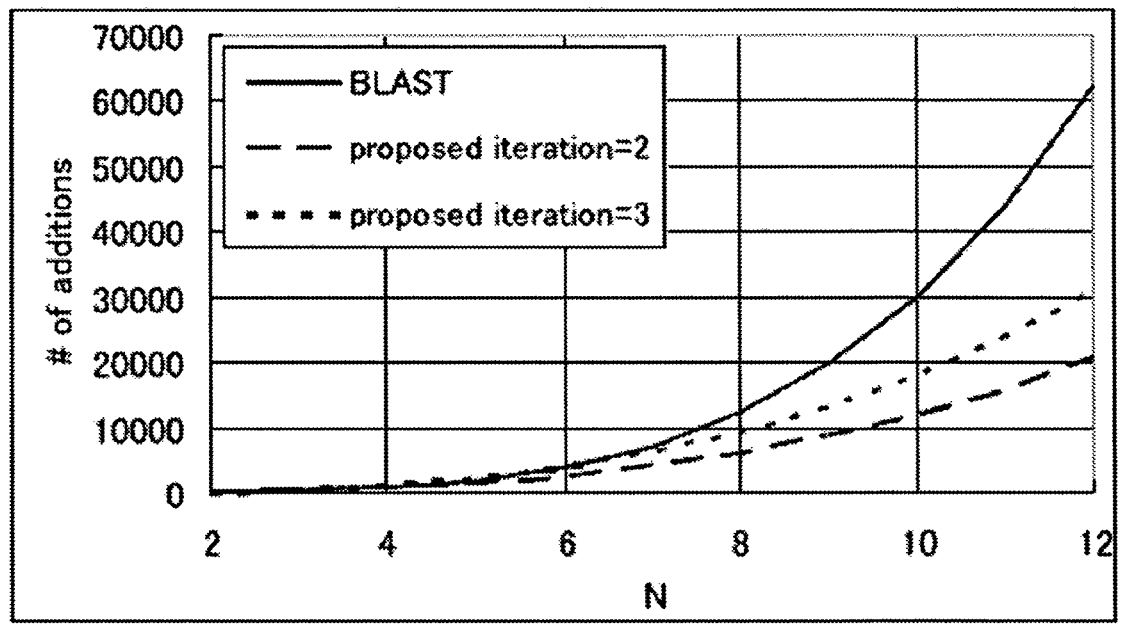
FIGS. 12A and 12B are diagrams comparing the number of additions.
Figure 12B:
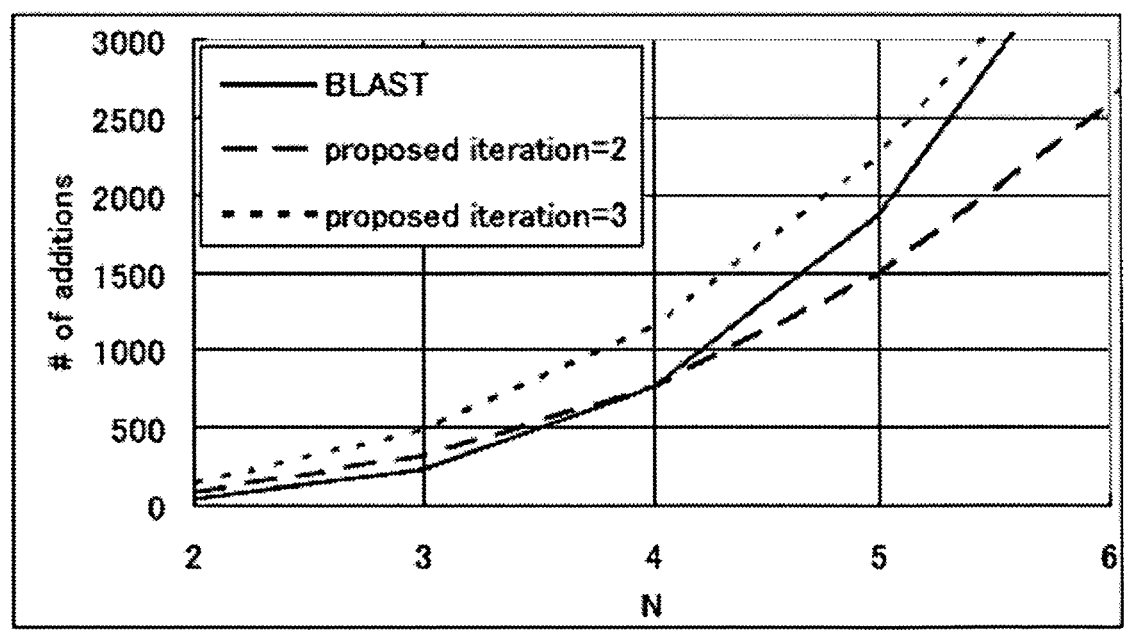

FIG. 9, FIG. 10A, and FIG. 10B show the comparison results for the number of multiplications. In addition, FIG. 11, FIG. 12A, and FIG. 12B show the comparison results for the number of additions. FIG. 10B is a diagram wherein FIG. 10A is partially enlarged, and FIG. 12B is a diagram wherein FIG. 12A is partially enlarged. In the formula for calculating the number of multiplications/additions of BLAST, since "$F(N^3)$" has a smaller degree of contribution on comparison to $N^4$ when N is increased, the calculations are performed regardless of "$F(N^3)$" in FIG. 9 to FIG. 12B.

In this way, when the number of transmitting/receiving antennas is increased, the computation effort required to estimate the transmitted symbol is greater in the BLAST compared to the algorithms in the embodiment according to the present invention. In the afore-mentioned example, if the number of transmitting antennas is four or more, the algorithm in the embodiment according to the present invention is more advantageous. Four or more transmitting antennas are generally provided in the MIMO system.

As stated above, the algorithm in the embodiment according to the present invention can achieve a superior receiving performance compared to the Zero Forcing algorithm and the MMSE algorithm. In addition, the algorithm in the embodiment according to the present invention requires less computational effort to estimate the transmitted symbol compared to the BLAST algorithm. It is needless to say that the computational effort of the algorithm in the embodiment according to the present invention is much smaller than that of the maximum likelihood decoding algorithm.

Embodiment 1

In Embodiment 1, the algorithm according to the present invention is applied to MIMO-OFDM system. The OFDM is, for example, described in the Document 5 (R. Van Nee and R. Prasad, "OFDM For Wireless Multimedia Communications", Artech House Publishers, 2000) and the Document 6 (L. J. Cimini, "Analysis and simulation of digital mobile channel using orthogonal frequency division multiple access", IEEE trans. Comm., pp. 665-675, 1995), and the MIMO-OFDM is described in the Document 7 (A. Van Zeist and al., "Implementation of a MIMO OFDM-based wireless LAN system", IEEE Trans. Signal. Process. 52, No 2, 2004, pp. 483-494). Here, the outlines are described.

OFDM is a technology which realizes high-speed transmission by lowering the rate of each sub-carrier and increasing the number of low-rate sub-carriers. Frequency bandwidth is divided into a plurality of small ranges which are each used as sub-carries. Sub-carriers are orthogonal to each other. In order to obtain this property, the sub-carrier frequencies must be spaced by a multiple of the inverse of the symbol duration. Furthermore, the channel must be estimated and corrected for each sub-carrier.

<Transmitter>

FIG. 13 is a configuration diagram of a MINO-OFDM transmitter. The configuration and operations of the transmitter are described below in reference to the diagrams.

High-speed binary data is encoded (convolutional code is an example), interleaved, and modulated (BPSK, QOSK, 16QAM, and the like). Subsequently, the data is converted into parallel low-speed modulated data streams which are fed to Nc sub-carriers. The modulated signals are frequency-division multiplexed by N-point inverse discrete Fourier transform (IDFT). The resulting OFDM signal is converted into an analog signal by a D/A converter and is upconverted into RF band and transmitted in the air.

Here, an OFDM system which transmits N symbols by using N sub-carriers is assumed. Then, the OFDM signal transmitted in the i-th OFDM symbol period is expressed by the following formula (31). Here, "s$^i$" represents the i-th transmitted symbol (including data and zero padding). "N" indicates block size. "j" is a square root of "−1".

$$x_k^{(i)} = \frac{1}{\sqrt{N}} \cdot \sum_{n=0}^{N-1} s_n^i \cdot \exp\left\{ j\frac{2\pi nk}{N} \right\} \quad (31)$$

$$0 \leq k < N$$

In the OFDM, a guard interval is inserted into every OFDM symbol to eliminate the influence of ISI (Inter Symbol Interference) and ICI (Inter channel Interference). Because of the guard interval structure, cyclic prefix, the delayed waves of OFDM symbol whose delay time is less than the guard interval, do not contaminate other OFDM symbols. Here, if the guard interval is a cyclic extension of the output stream, the transmitted signal into which the guard interval is inserted is expressed by the following formula (32). In addition, "G" indicates the length of the guard interval.

$$\tilde{x}_k^j = \begin{cases} x_{N-G+k}^j & 0 \leq k < G \\ x_{k-G}^j & G \leq k < N+G \end{cases} \quad (32)$$

If the propagation channel comprise P discrete paths with different amplitudes and time delays, the baseband impulse response is expressed by the following formula (33). "$\alpha_p$" and "$\tau_p$" indicate respectively the complex channel coefficient and the time delay of the p-th discrete path.

$$h(t, \tau) = \sum_{p=0}^{P-1} \alpha_P(t) \cdot \delta(\tau - \tau_p) \quad (33)$$

Furthermore, the total channel power is assumed to be "1", and it is assumed that τmax=maxτj<N. If coherent detection is performed (namely, timing is perfect), only one OFDM symbol interferes. Then, the channel transfer function H in the frequency domain is expressed by the following formula (34).

$$H(f, t) = \sum_{p=0}^{P-1} \alpha_p \cdot \exp[-j2\pi f \tau_p] \quad (34)$$

<Receiver>

Figure 14:
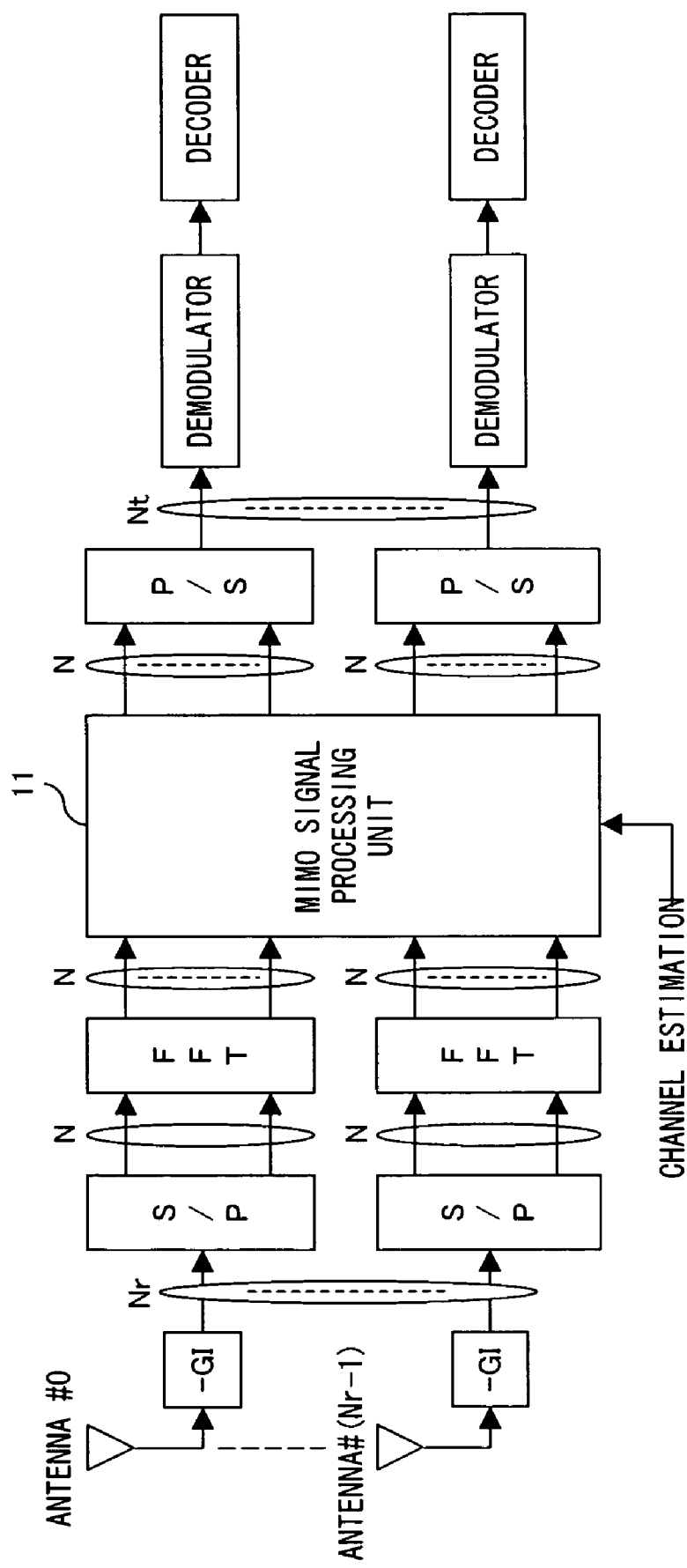
FIG. 14 is a configuration diagram of a MINO-OFDM receiver.

FIG. 14 is a configuration diagram of the MINO-OFDM receiver. The configuration and operations of the receiver are described below, in reference to this figure.

The received signal is filtered by a band pass filter (BPF), and then down-converted to a lower frequency. The down-converted signal is sampled by A/D converter (namely, converted into a digital signal), and the guard interval is removed. After the sampled data is fed to the N-point discrete Fourier transformer (DFT), it is de-multiplexed as sub-carrier channel data. In order to compensate the channel parameter, the Minimum Mean Square Error or the Zero Forcing coefficients are utilized, thereby compensating the channel for each sub-carrier in the frequency domain. Finally, the data in these sub-carriers are demodulated, de-interleaved, and decoded.

Here, if the guard interval is greater than the maximum delay spread, the received baseband signal can be expressed by the following formula (35). Here, "r" and "n" are the received signal of the OFDM symbol and the AWGN (Additive White Gaussian Noise), after the guard interval is removed and before processing.

$$r_k^j = \sum_{p=0}^{P-1} \alpha_P \cdot x_{k-\tau_p}^j + \tilde{n}_k^i \quad 0 \leq k < N \quad (35)$$

Thereafter, the demodulation is performed, and the decision is taken about the information bit.

As stated above, channel variation must be corrected for every sub-carrier. For example, in the case of IEEE 802.11a and 802.11g standard, the IFFT/FFT dimension is 64, however only 48 sub-carries are used to transmit data symbols. Four sub-carries are used to synchronize the data frame in the frequency domain. The other 12 sub-carriers are for the guard band which are not used in the transmission at all. In this case, channel has to be estimated and corrected only for the 48 subcarriers that are used in the transmission of the data symbols.

<Application of the Present Invention to MIMO-OFDM>

The transmitter comprises Nt transmitting antennas. In addition, independent channel encoders are used for each transmitting antenna. The output from each encoder is carried separately on a plurality of sub-carriers and transmitted through the corresponding antennas.

The receiver comprises Nr receiving antennas. After Fourier transform is performed on each of the signals received through these antennas, they are fed to the MIMO signal processing unit 11. Here, the MIMO signal processing unit 11 comprises a signal regeneration unit 4 which performs the algorithms in the embodiment according to the present invention, and is realized by a processor which executes a pre-described program. Furthermore, the output of the MIMO signal processing unit 11 is Nt independent data streams, and each data stream is independently demodulated and decoded.

Embodiment 2

In Embodiment 2, the algorithms according to the present invention are used in a multi-carrier CDMA system. The multi-carrier CDMA technology is incorporated into the OFDM modulation for multi-access. In addition, the multi-carrier CDMA is described, for example, in the Document 8 (Yee N., J. P. Linnartz and G. Fettweis, "Multi-carrier CDMA in indoor wireless radio networks", IEICE Trans. Comm., E77-B pp: 900-904, July 1994) and Document 9 (S. Abeta, H. Atarashi and M. Sawahasgi, "Performance of Coherent Multi-Carrier/DS-CDMA and MC-CDMA for Broadband Packet Wireless Access", IEICE Trans. Commun., vol. E84-B, No. 3 March 2001).

<Transmitter>

Figure 15:
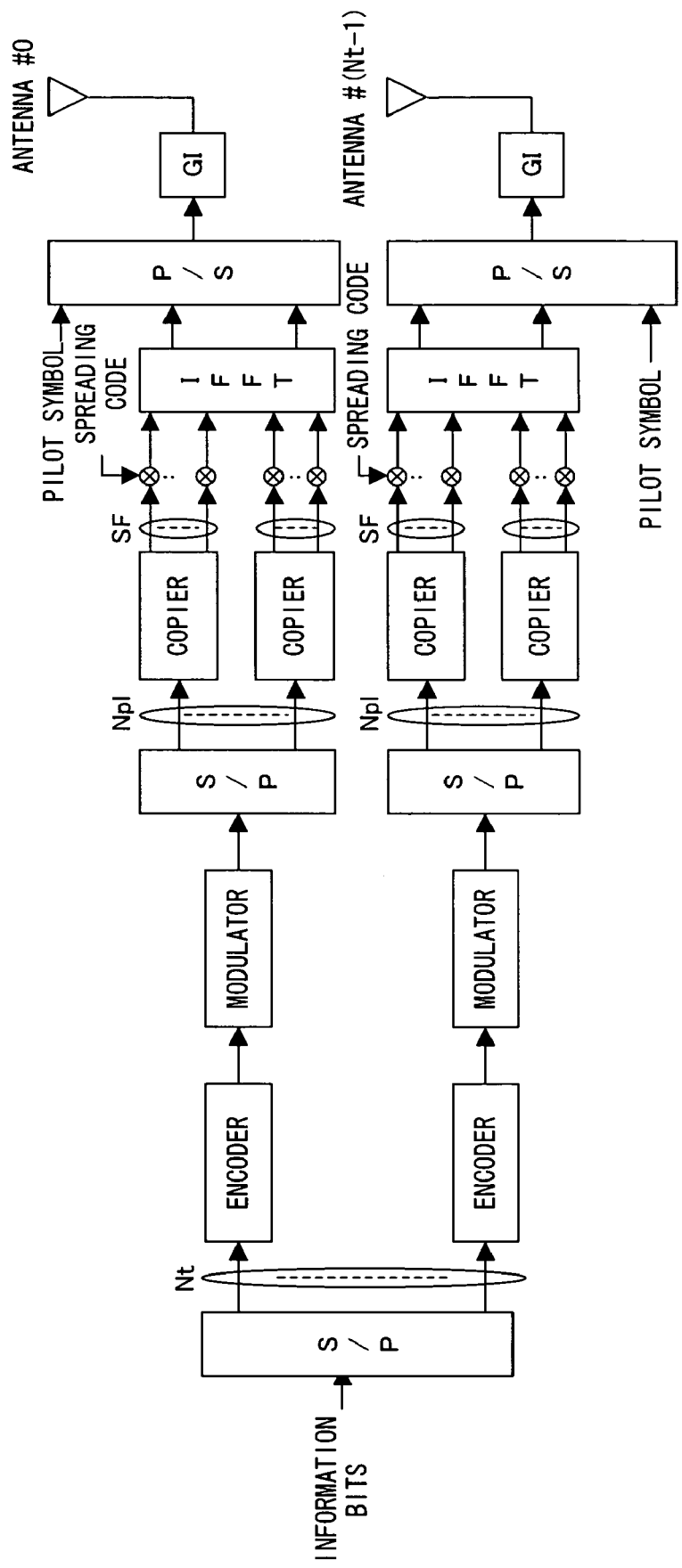
FIG. 15 is a configuration diagram of a multi-carrier CDMA transmitter.

FIG. 15 is a configuration diagram of a multi-carrier CDMA transmitter. The configuration and operations of the transmitter are described below, in reference to the diagram.

The multi-carrier CDMA signal is generated as below-mentioned. Namely, the binary data is encoded (convolutional coding or turbo coding etc.) and modulated (BPSK, QPSK, 16QAM, and the like). Npl data symbols are simultaneously processed. A signal data symbol is replicated into SP parallel copies. In this case, data is transmitted by using an Npl×SP sub-carriers. Data is multiplied by spreading code on each sub-carrier. The spreading code is preferably the orthogonal code of length SF.

The transmitter spreads the signal using the spreading code in the frequency domain. Thereafter, Inverse Fast Fourier Transform (IFFT) is executed. The dimension of IFFT is "Npl×SF". After parallel data is converted into serial data, guard interval for avoiding Inter Symbol Interference is added.

<Receiver>

Figure 16:
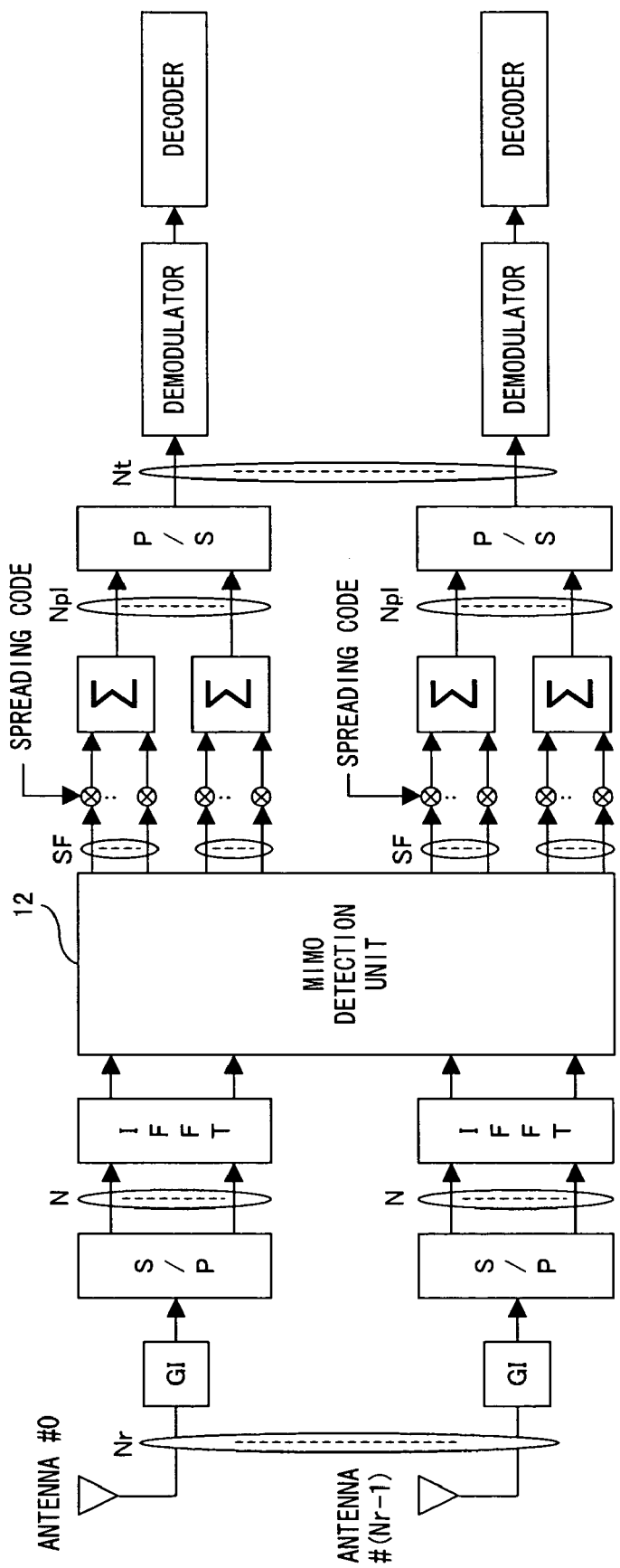
FIG. 16 is a configuration diagram of a multi-carrier CDMA receiver.

FIG. 16 is a configuration diagram of a multi-carrier CDMA receiver. The configuration and operations of the receiver is described below, in reference to the diagram.

The guard interval is removed from the received signal, and the received signal is further converted into parallel data and fed to the Fast Fourier Transform (FFT). The pilot symbol can be used for channel estimation for every sub-carrier. Channel compensation is performed with the output of the Fast Fourier Transform (FFT). As other combining schemes, ORC (Orthogonal restoring combining), EGC (Equal gain combining), MMRC (Maximum ratio combining), (MMSEC (Minimum mean square error combining), and the like are applied. Thereafter, data of the corresponding user is extracted from the signal. Orthogonality between the spreading codes is used to extract the data. This processing is performed for every sub-carrier. The data is coherently accumulated over the interval of SF chips in the frequency domain.

The OFDM transmission scheme can be considered as a particular case of multi-carrier CDMA (namely, SF=1)

<Application of the Present Invention to Multi-Carrier CDMA>

The transmitter is provided with Nt transmitting antennas. The signals transmitted through each transmitting antenna each include a plurality of sub-carriers, and spreading process is performed on the signals of each sub-carrier.

The receiver is provided with Nr receiving antennas. The algorithm according to the present invention is performed for every sub-carrier by the MIMO detection unit 12 before despreading process is performed. The MIMO detection unit 12 comprises a signal regeneration unit 4 and is realized by the processor which executes the pre-described program. Here, the position wherein the MIMO detection unit 12 is provided is the same as that in an publicly known configuration, and it is the same position as that wherein the processing unit is provided to execute the MMSE algorithm, the BLAST algorithm, or the like in a conventional transmitting device.

Embodiment 3

In Embodiment 3, the algorithm according to the present invention is used as a time domain equalizer in a single carrier communication system. In this case, the transmitter, as shown in FIG. 17A, comprises a serial/parallel converter for creating Nt data streams from the input data, Nt encoders for individually encoding each data stream, Nt modulators for individually modulating each data stream, and Nt transmitting antennas for individually transmitting each modulated signal.

The receiver, as shown in FIG. 17B, comprises Nr receiving antennas, the MIMO processing unit 13, Nt demodulators for demodulating the output of the MIMO processing unit 13, and Nt decoders for decoding the demodulated signals. The MIMO processing unit 13 operates as a time domain equalizer by executing the algorithms according to the present invention and outputs the estimated values of the Nt transmitted symbols from the Nr received signals.

Embodiment 4

Figure 18A:
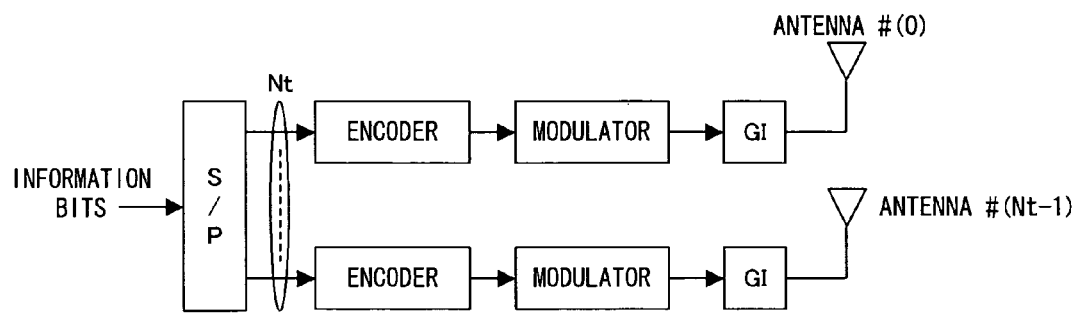
FIG. 18A is a configuration diagram of the transmitter in a fourth embodiment.

In Embodiment 4, the algorithm according to the present invention is used as a frequency domain equalizer in a single carrier communication system. In this case, the transmitter, as shown in FIG. 18A, is obtained by adding a function to insert the guard interval GI into the transmitter in the third Embodiment. The guard interval is inserted every N data.

Figure 18B:
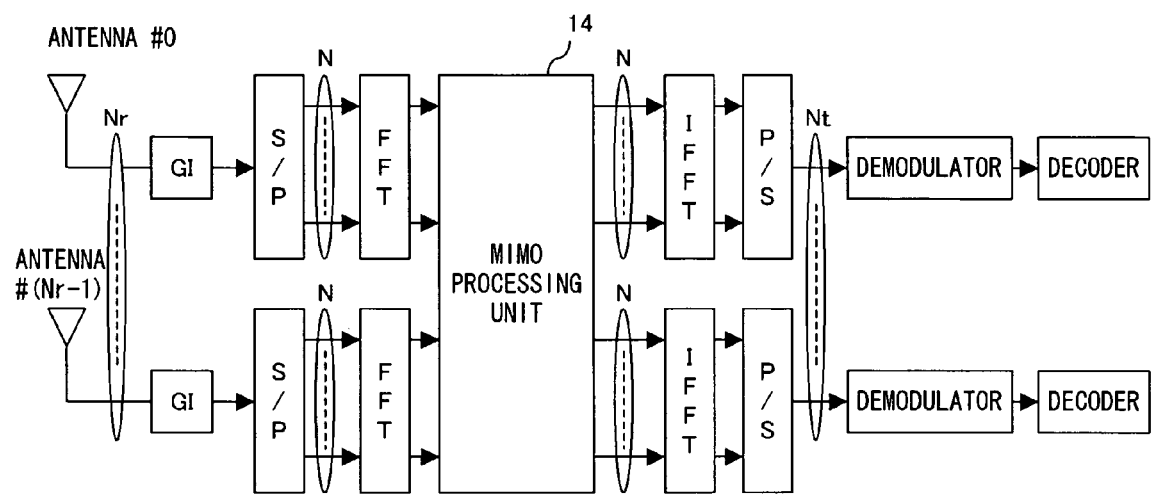
FIG. 18B is a configuration diagram of the receiver in a fourth embodiment.

In the receiver, as shown in FIG. 18B, after the guard interval GI is removed, each of the signals received through corresponding receiving antenna is converted into N parallel data. Namely, Nr sets of N parallel data are created. Then, each N parallel data is converted into the signals in the frequency domain by the Fast Fourier Transform (FFT) and are fed to the MIMO detection unit 14.

The MIMO detection unit 14 operates as a frequency domain equalizer by executing the algorithms according to the present invention and outputs the estimated values of the Nt sets of N parallel data from the Nr sets of N parallel data. After the output of the MIMO detection unit 14 is converted into a signal in the time domain by the Inverse Fast Fourier Transformer (IFFT), it is demodulated and decoded.

Embodiment 5

In Embodiment 5, the algorithm according to the present invention is applied to a single carrier CDMA. In this case, as shown in FIG. 19A, the transmitter is obtained by providing a spreader to spread signal using spreading code in the transmitter of the third Embodiment. The transmitted signal is spread in the time domain by multiplying the spreading code. In addition, as shown in FIG. 19B, the receiver is obtained by providing a de-spreader to de-spread the received signal using the spreading code.

Embodiment 6

The present invention is not limited to the afore-mentioned Embodiments 1 to 5, and the following embodiments can also be possible.

(1) The receiver according to the present invention may comprise a space canceller. The space canceller is a circuit which cancels a radio signal coming from a specified direction. The signal regeneration unit 4 which performs the algorithm according to the present invention may, for example, estimate the transmitted symbol from the output of the space canceller. Alternatively, the output of the signal regeneration unit 4 may be fed to the space canceller. According to this configuration, receiving performance is further improved because the influence of unnecessary radio signals can be suppressed.

(2) The receiver according to the present invention may comprise a Maximum Likelihood Decoder (MLD). In this case, for example, the output of the signal regeneration unit 4 which performs the algorithm according to the present invention is fed to the Maximum Likelihood Decoder. According to this configuration, the receiving characteristics are further improved.

(3) Although the afore-mentioned embodiments are described under the presumption that a MIMO system is implemented, the present invention is not limited to this and can also be applied to a system wherein signals transmitted from one transmitting antenna are received by a plurality of receiving antennas. In addition, the afore-mentioned embodiments do not exclude a configuration wherein signals transmitted from one transmitting antenna are received by one receiving antenna.

(4) In the afore-mentioned embodiments, although the MMSE is introduced as an algorithm for estimating the transmitted symbol, the present invention is not limited to this configuration. Namely, one of the characteristics of the present invention is to repeat the estimating processing while using the information indicating the likelihood of the estimation results of the transmitted symbol for the next estimation processing, and the estimation algorithm is not limited to the MMSE. Therefore, the transmitted symbol may be estimated by other algorithms (for example, Zero Forcing algorithm, BLAST algorithm, maximum likelihood decoding algorithm, and the like) in place of the MMSE algorithm.

(5) Although it is stated, in the afore-mentioned embodiments, that the modulation method of the MIMO system is BPSK, the modulation method is not particularly limited when introducing the algorithm according to the present invention.

What is claimed is:

1. A receiving device comprising:
   an estimation unit for estimating a transmitted symbol from signals received using a plurality of antennas according to a status of channels which transmit signals from a transmitting device;
   a likelihood calculation unit for calculating a likelihood of the transmitted symbol estimated by said estimation unit; and
   an iterative unit for giving information indicating the likelihood to said estimation unit and for causing said estimation unit and said likelihood calculation unit to repeatedly execute the estimation and the calculation, respectively;
   wherein said estimation unit estimates the transmitted symbol using the information indicating the likelihood in a second and subsequent estimation, and
   said likelihood calculation unit calculates a log likelihood ratio of an estimated transmitted symbol and updates the log likelihood ratio obtained in a previous iterative cycle for every iterative cycle according to:

$$L^{(i+1)}(x_k) = L^{(i)}(x_k) + \Delta L(x_k)$$

$$\begin{cases} L^{(i)}(x_k) = L(x_k / \hat{x}_k^{(i)}) \\ \Delta L(x_k) = \ln \frac{P(\hat{x}_k / x_k = +1)}{P(\hat{x}_k / x_k = -1)} \end{cases}$$

$$P(\hat{x}_k / x_k = b) \propto \exp\left(-\frac{(\hat{x}_k - \mu_k(b))^2}{\sigma_k^2(b)}\right)$$

$$\begin{cases} \mu_k(b) = E\{\hat{x}_k / x_k = b\} \\ \sigma_k^2(b) = \text{Cov}(\hat{x}_k, \hat{x}_k / x_k = b) \end{cases}$$

where "$\Delta L (x_k)$" is defined by a logarithm of a ratio of a probability when a symbol transmitted from a k-th transmitting antenna is "+1" and a probability when the symbol transmitted from the k-th transmitting antenna is "−1", "$\mu_k$" is a mean value of estimated values of symbols transmitted from the k-th transmitting antenna, and "$\sigma_k^2$" is a variance of the estimated values of the symbols transmitted from the k-th transmitting antenna.

2. The receiving device according to claim 1, wherein said estimation unit comprises:
   a unit for calculating a compensation coefficient to compensate the influence on signals caused by transmission through the channels according to the information indicating the likelihood; and
   a unit for estimating the transmitted symbol from the received signal using the compensation coefficient.

3. The receiving device according to claim 1, wherein said estimation unit comprises;
   a unit for calculating a mean value of the transmitted symbol based on the information indicating the likelihood;
   a unit for calculating the variance of the transmitted symbol based on the mean value;
   a unit for calculating a compensation coefficient to compensate the influence on signals caused by transmission though the channels based on the variance; and
   a unit for estimating the transmitted symbol from the received signals using the compensation coefficient.

4. The receiving device according to claim 1, wherein said estimation unit estimates the transmitted symbol from signals received using the plurality of antennas with a Minimum Mean Square Error algorithm.

5. The receiving device according to claim 1, wherein said receiving device is used as a time domain equalizer in a single carrier communication system.

6. The receiving device according to claim 1, wherein said receiving device is used as a frequency domain equalizer in a single carrier communication system.

7. The receiving device according to claim 1, wherein said receiving device is used in a single carrier CDMA.

8. The receiving device according to claim 1, wherein said receiving device is used in an OFDM system.

9. The receiving device according to claim 1, wherein said receiving device is used in a multi-carrier CDMA system.

10. The receiving device according to claim 1, further comprising a space canceller, wherein:
    said estimation unit estimates the transmitted symbol from the received signals processed by said space canceller.

11. The receiving device according to claim 1, further comprising a maximum likelihood decoding circuit for performing a maximum likelihood decoding on the estimation results of said estimation unit.

12. A receiving device for receiving signals using a plurality of antennas, comprising:
- an estimation unit for estimating a transmitted symbol from signals received using the plurality of antennas according to a status of channels which transmit signals from a transmitting device;
- a likelihood calculation unit for calculating a likelihood of the transmitted symbol estimated by said estimation unit; and
- an iterative unit for giving information indicating the likelihood to said estimation unit and for causing said estimation unit and said likelihood calculation unit to repeatedly execute the estimation and the calculation, respectively;
- wherein said estimation unit estimates the transmitted symbol using the information indicating the likelihood in a second and subsequent estimation, and
- said likelihood calculation unit calculates a log likelihood ratio of an estimated transmitted symbol and updates the log likelihood ratio obtained in a previous iterative cycle for every iterative cycle according to:

$$L^{(i+1)}(x_k) = L^{(i)}(x_k) + \Delta L(x_k)$$

$$\begin{cases} L^{(i)}(x_k) = L(x_k / \hat{x}_k^{(i)}) \\ \Delta L(x_k) = \ln \dfrac{P(\hat{x}_k / x_k = +1)}{P(\hat{x}_k / x_k = -1)} \end{cases}$$

$$P(\hat{x}_k / x_k = b) \propto \exp\left(-\dfrac{(\hat{x}_k - \mu_k(b))^2}{\sigma_k^2(b)}\right)$$

$$\begin{cases} \mu_k(b) = E\{\hat{x}_k / x_k = b\} \\ \sigma_k^2(b) = \operatorname{Cov}(\hat{x}_k, \hat{x}_k / x_k = b) \end{cases}$$

where "$\Delta L(x_k)$" is defined by a logarithm of a ratio of a probability when a symbol transmitted from a k-th transmitting antenna is "+1" and a probability when the symbol transmitted from the k-th transmitting antenna is "−1", "$\mu_k$" is a mean value of estimated values of symbols transmitted from the k-th transmitting antenna, and "$\sigma_k^2$" is a variance of the estimated values of the symbols transmitted from the k-th transmitting antenna.

13. A MIMO system comprising a transmitting device with a plurality of transmitting antennas and a receiving device with a plurality of receiving antennas, wherein said receiving device comprises:
- an estimation unit for estimating transmitted symbols from signals received using the plurality of receiving antennas according to a status of channels which transmit signals from the transmitting device;
- a likelihood calculation unit for calculating a likelihood of the transmitted symbols estimated by said estimation unit; and
- an iterative unit for giving information indicating the likelihood to said estimation unit and for causing said estimation unit and said likelihood calculation unit to repeatedly execute the estimation and the calculation, respectively;
- wherein said estimation unit estimates the transmitted symbol using the information indicating the likelihood in a second and subsequent estimation, and
- said likelihood calculation unit calculates a log likelihood ratio of an estimated transmitted symbol and updates the log likelihood ratio obtained in a previous iterative cycle for every iterative cycle according to:

$$L^{(i+1)}(x_k) = L^{(i)}(x_k) + \Delta L(x_k)$$

$$\begin{cases} L^{(i)}(x_k) = L(x_k / \hat{x}_k^{(i)}) \\ \Delta L(x_k) = \ln \dfrac{P(\hat{x}_k / x_k = +1)}{P(\hat{x}_k / x_k = -1)} \end{cases}$$

$$P(\hat{x}_k / x_k = b) \propto \exp\left(-\dfrac{(\hat{x}_k - \mu_k(b))^2}{\sigma_k^2(b)}\right)$$

$$\begin{cases} \mu_k(b) = E\{\hat{x}_k / x_k = b\} \\ \sigma_k^2(b) = \operatorname{Cov}(\hat{x}_k, \hat{x}_k / x_k = b) \end{cases}$$

where "$\Delta L(x_k)$" is defined by a logarithm of a ratio of a probability when a symbol transmitted from a k-th transmitting antenna is "+1" and a probability when the symbol transmitted from the k-th transmitting antenna is "−1", "$\mu_k$" is a mean value of estimated values of symbols transmitted from the k-th transmitting antenna, and "$\sigma_k^2$" is a variance of the estimated values of the symbols transmitted from the k-th transmitting antenna.

14. A transmitted symbol estimation method for estimating a transmitted symbol in a receiving device of a MIMO system, wherein said method comprising:
- estimating a transmitted symbol from signals received using a plurality of antennas according to a status of channels which transmit signals from a transmitting device;
- calculating a likelihood of the estimated transmitted symbol; and
- repeating the estimation and the calculation using the information indicating the likelihood;
- wherein the transmitted symbol is estimated using the information indicating the likelihood in a second and subsequent estimation, and
- a log likelihood ratio of an estimated transmitted symbol is calculated and the log likelihood ratio obtained in a previous iterative cycle for every iterative cycle is updated according to:

$$L^{(i+1)}(x_k) = L^{(i)}(x_k) + \Delta L(x_k)$$

$$\begin{cases} L^{(i)}(x_k) = L(x_k / \hat{x}_k^{(i)}) \\ \Delta L(x_k) = \ln \dfrac{P(\hat{x}_k / x_k = +1)}{P(\hat{x}_k / x_k = -1)} \end{cases}$$

$$P(\hat{x}_k / x_k = b) \propto \exp\left(-\dfrac{(\hat{x}_k - \mu_k(b))^2}{\sigma_k^2(b)}\right)$$

$$\begin{cases} \mu_k(b) = E\{\hat{x}_k / x_k = b\} \\ \sigma_k^2(b) = \operatorname{Cov}(\hat{x}_k, \hat{x}_k / x_k = b) \end{cases}$$

where "$\Delta L(x_k)$" is defined by a logarithm of a ratio of a probability when a symbol transmitted from a k-th transmitting antenna is "+1" and a probability when the symbol transmitted from the k-th transmitting antenna is "−1", "$\sigma_k$" is a mean value of estimated values of symbols transmitted from the k-th transmitting antenna, and "$\sigma_k^2$" is a variance of the estimated values of the symbols transmitted from the k-th transmitting antenna.

* * * * *